United States Patent [19]

Asakura et al.

[11] Patent Number: 5,678,093
[45] Date of Patent: Oct. 14, 1997

[54] CAMERA

[75] Inventors: Yasuo Asakura; Setsuya Kataoka; Yoshihiro Maeda; Keita Takahashi, all of Hachioji, Japan

[73] Assignee: Olympus Optical Co., Ltd., Tokyo, Japan

[21] Appl. No.: 636,138

[22] Filed: Apr. 18, 1996

Related U.S. Application Data

[62] Division of Ser. No. 273,702, Jul. 12, 1994.

[30] Foreign Application Priority Data

| Jul. 13, 1993 | [JP] | Japan | 5-173463 |
| Jul. 13, 1993 | [JP] | Japan | 5-173464 |
| Jul. 13, 1993 | [JP] | Japan | 5-173465 |
| Jul. 13, 1993 | [JP] | Japan | 5-173466 |
| Jul. 13, 1993 | [JP] | Japan | 5-173467 |
| Sep. 21, 1993 | [JP] | Japan | 5-235184 |

[51] Int. Cl.⁶ .................. G03B 13/10; G03B 17/00
[52] U.S. Cl. .................... 396/379; 396/436
[58] Field of Search .................... 354/199, 219, 354/222, 159; 396/378, 379, 380, 435, 436

[56] References Cited

U.S. PATENT DOCUMENTS

| 3,878,330 | 4/1975 | Novak | 178/7.92 |
| 4,615,596 | 10/1986 | Muller et al. | 354/76 |
| 4,945,372 | 7/1990 | Higuchi et al. | 354/199 |
| 5,036,346 | 7/1991 | Hatamori et al. | 354/195.12 |
| 5,115,267 | 5/1992 | Kondo et al. | 354/221 |
| 5,204,783 | 4/1993 | Buss et al. | 359/811 |
| 5,251,840 | 10/1993 | Niedospial | 242/71.1 |
| 5,325,140 | 6/1994 | Torikoshi et al. | 354/159 |
| 5,335,030 | 8/1994 | Suzuka | 354/149.1 |
| 5,424,793 | 6/1995 | Fukushima et al. | 354/199 |

FOREIGN PATENT DOCUMENTS 545801A 2/1993 Japan.

Primary Examiner—Safet Metjahic
Assistant Examiner—John Chizmar
Attorney, Agent, or Firm—Louis Weinstein

[57] ABSTRACT

A camera having: a substantially cylindrical-shaped, rotatable cam, limited to rotate unidirectionally. A drive belt conveys rotation of the rotary member, which rotates due to zooming of lens array, to drive the cam. A viewfinder optical system including a stationary objective lens, two prisms, a stationary eyepiece lens, and two variable-power lenses, when coupled with the cam member, advances or withdraws along the optical-axis during movement. An eyepiece variable-power lens is inserted into the optical path of the viewfinder optical system. A viewfinder panoramic field mask is united with an eyepiece variable-power lens. Upper and lower masks change picture size. A first rack extends in a moving direction of the masks. A second rack extends in a moving direction of the viewfinder panoramic field mask. A panoramic-mode setting gear engages the two racks. A plurality of panoramic-mode parallax compensation marks appear at a trimmed range position within the viewfinder field mask. Normal picture size-mode parallax compensation marks are removed from the field during a high power. A viewfinder objective lens sliding axis pin retained by the objective lens or first prism, guides the two variable-power lenses along the optical axis. One end of a viewfinder lens base retained by the stationary objective lens or first prism, has a ditch restraining rotation of the two variable-power lenses about the viewfinder objective lens sliding axis.

12 Claims, 13 Drawing Sheets

CAMERA

This is a division of application Ser. No. 08/273,702, filed Jul. 12, 1994.

BACKGROUND OF THE INVENTION

1. Field of the Invention

The present invention relates to a camera, and more particularly, to a camera having a viewfinder optical system.

2. Description of the Related Art

In the past, various proposals have been made for a camera having a viewfinder optical system that makes a movement for varying the power thereof responsively to a zooming movement of a photographing lens array.

In an example of this kind of camera disclosed in, for example, Japanese Patent Laid-Open No. 54-26721, the size of a field of view is changed responsively to a movement of a viewfinder optical system.

According to the Japanese Patent Laid-Open No. 54-26721, an objective optical system in the camera is responsible for varying the power of the viewfinder optical system. This poses a problem that the camera must be big in size.

Japanese Patent Laid-Open No. 62-265632 has disclosed a camera in which a cam plate interlocked with a lens barrel is used to drive variable-power lenses of a viewfinder optical system.

According to the Japanese Patent Laid-Open No. 62-265632, a drive mechanism is located far above a viewfinder. Another space is needed to accommodate a mechanism for interlocking a photographing lens array with the viewfinder drive mechanism.

Japanese Patent Laid-Open No. 1-107240 has disclosed a camera in which a viewfinder field frame is changed in size responsively to a movement for varying the power of the viewfinder made by an eyepiece lens.

According to an embodiment of the Japanese Patent Laid-Open No. 1-107240, the power of a viewfinder is varied with a zooming movement of an eyepiece lens. This poses a problem that the camera gets thick and large-sized. Furthermore, since a liquid-crystal device is mounted to display marks or the like in a viewfinder field that is a field provided by the viewfinder, electrical control is needed.

In Japanese Patent Laid-Open No. 2-188708, a lens holder for holding movable lenses of a viewfinder optical system is abutted on a cam plane that is a twisted slope formed around a rotation axis, and thus driven for zooming.

According to the Japanese Patent Laid-Open No. 2-188708, the movable lenses are moved for zooming via the lens holder. It is therefore hard to improve precision in positioning the movable lenses. Furthermore, since a guide axis is retained by a frame and a lens base, the relative positions of a stationary optical system and a movable optical system are determined less precisely. Moreover, a space is needed to accommodate a gear array for rotating the cam.

In general, as far as a zoom viewfinder is concerned, when a viewfinder optical system is small-sized, if the precision in determining the relative positions of lenses in the viewfinder optical system deteriorates even slightly, a view formed by the viewfinder drastically deteriorates in quality. There have been difficulties in realizing a small-sized viewfinder optical system without sacrificing the quality of a view.

On the other hand, various proposals have been made for a camera capable of changing picture sizes in recent years.

A so-called panoramic camera is typical of this kind of camera. In a camera capable of changing picture sizes, marks defining a panoramic range are displayed in a viewfinder field corresponding to a normal picture size.

This display means makes it hard to discern an actual picture size or a range of film actually photographed. An inexperienced photographer may fail to pose an object within a picture size.

In an effort to solve the aforesaid problems, a proposal has been made for a camera that controls the size of a viewfinder field according to a picture size so that the viewfinder field will be consistent with the picture size.

An example of this kind of camera has been disclosed in, for example, Japanese Examined Utility Model Publication No. 35-25058, wherein a picture mask is changed in size to change a viewfinder mask responsively.

According to the Japanese Examined Utility Model Publication No. 35-25058, a crank is employed as a switching mechanism. This poses a problem that the drive occupies a large area.

Various proposals have been made for a camera having a viewfinder optical system that displays parallax compensation marks for trimming-mode photography.

An example of this kind of camera has been described in the Japanese Patent Laid-Open No. 1-107240, wherein when the power of a viewfinder is changed, a viewfinder field frame is seen unchanged but indications in the viewfinder are seen at a varied magnification.

Japanese Unexamined Utility Model Publication No. 60-63834 has disclosed another example of a camera in which when the power of a viewfinder is changed, a mark plate associated with a new power of the viewfinder is selected.

According to the Japanese Unexamined Utility Model Publication No. 60-63834, indications outside a viewfinder field are changed in size. However, indications seen in the viewfinder field cannot be changed in size in compliance with a change in power of the viewfinder.

OBJECTS AND SUMMARY OF THE INVENTION

The first object of the present invention is to provide a small-sized camera.

The second object of the present invention is to provide a camera with a viewfinder permitting better discernment.

The third object of the present invention is to provide a camera having a small-sized viewfinder.

The fourth object of the present invention is to provide a camera with a small-sized viewfinder permitting better discernment and being responsive to a zooming movement of a photographing lens array.

The fifth object of the present invention is to provide a viewfinder mechanism for a camera that has a simple structure and whose components can be laid out highly freely.

The sixth object of the present invention is to provide a camera having a viewfinder whose display is easy to see.

The seventh object of the present invention is to provide a camera having a viewfinder optical system that is responsive to a zooming movement of a photographing lens array and has a simple structure and whose components can be laid out freely.

The eighth object of the present invention is to provide a viewfinder mechanism for a small-sized camera whose power can be changed responsive to a change in size of a viewfinder field that is a field provided by a viewfinder.

The ninth object of the present invention is to provide a small-sized camera being capable of changing picture sizes and offering a field size and a power, which permit better discernment, associated with a selected picture size.

The tenth object of the present invention is to provide a camera offering easy-to-see parallax compensation marks despite a change in power of a viewfinder optical system.

The eleventh object of the present invention is to provide a viewfinder mechanism for a camera that is small-sized, enables positioning of optical elements with high precision, and permits better discernment.

Briefly, the present invention provides a camera comprising a real-image viewfinder placed independently of a photographing lens array, a variable-power lens to be inserted into the optical path of the viewfinder in order to vary the power of the viewfinder, a picture size changing means for changing picture sizes; that is, the size of a photographic range of film, a field mask lying in the vicinity of a primary image formation plane in the viewfinder and changing the aspect ratio or a viewfinder field responsive to a change in picture size, and an interlocking means for inserting or withdrawing the variable lens and changing the size of the field mask responsive to a movement of the picture size changing means.

The present invention provides a camera comprising a zoom viewfinder optical system composed of stationary optical elements that are locked and movable optical elements that move along the optical axis for zooming, and an axis means for guiding the movable optical elements along the optical axis. The axis means is fixed directly to at least one of the stationary optical elements. Each of the movable optical elements includes a fitting section that is formed as part of the movable optical element and into which the axis means is fitted.

The present invention provides a camera comprising a viewfinder optical system, a frame member for retaining the viewfinder optical system, at least one viewfinder variable-power lens for moving along the optical axis so as to vary the power of the viewfinder optical system, a stationary lens or prism located ahead of or behind the viewfinder variable-power lens and retained by the frame member, a guide axis for guiding the variable-power lens along the optical axis, and a rotation restraining member for restraining the variable-power lens from rotating about the guide axis. Herein, the stationary lens or prism retains one end of the guide axis and rotation restraining member.

The present invention provides a camera comprising a viewfinder optical system whose power is varied responsive to a trimming movement, a field frame for changing the size of a viewfinder field responsive to a trimming movement, and a plurality of parallax compensation marks appearing at positions defining a trimming range. The parallax compensation marks assume sizes or thicknesses associated with powers of the viewfinder optical system. When the viewfinder optical system offers a high power, the parallax compensation masks associated with a low power are expelled from the viewfinder field. Thus, photography can be achieved in a trimming mode in which picture sizes are changed; that is, the size of a photographic range of film is changed.

The present invention provides a camera comprising a picture mask for changing picture sizes, a first rack extending in a direction in which the picture mask moves, a field mask for changing the size of a viewfinder field, a second rack extending in a direction in which the field mask moves, and a gear engaging with the first rack and second rack. Herein, the field mask moves with the movement of the picture mask.

The present invention provides a viewfinder mechanism for a camera, comprising a viewfinder optical system, a variable-power lens inserted into the optical path of the viewfinder optical system in order to vary the power of the viewfinder optical system, a holder frame for retaining the variable-power lens, a field changing frame formed as part of the holder frame in order to change the range of the viewfinder field, and a positioning means that, when the field changing frame is inserted into the optical path of the viewfinder optical system, stops the variable-power lens at a different position in a direction in which the field changing frame moves.

The present invention provides a camera comprising a cylindrical member supported freely rotatively, a constraining member for constraining the cylindrical member to rotate unidirectionally, a rotary member to be rotated responsive to a zooming movement of a photographing lens array, a belt member for conveying the rotational motion of the rotary member to the cylindrical member so as to drive the cylindrical member, and a viewfinder optical system that, when coupled with the outer circumference of the cylindrical member by means of a cam, advances or withdraws along the optical axis responsive to a zooming movement of the photographing lens array.

The present invention provides a camera having a zoom viewfinder, comprising an optical system for zooming, a driven member that is driven responsive to a zooming movement, a zoom viewfinder optical system, a driving member for driving the zoom viewfinder optical system, and a coupling member that is sufficiently flexible to interlock the driven member with the driving member.

The present invention provides a camera comprising a cylindrical member supported freely rotatively, a constraining member for constraining the cylindrical member to rotate unidirectionally, a rotary member to be rotated responsive to a movement for varying powers made by a first optical system, a belt member for conveying the rotational motion of the rotary member to the cylindrical member so as to drive the cylindrical member, and a second optical system that, when coupled with the outer circumference of the cylindrical member by means of a cam, moves to vary powers responsive to a movement for varying powers made by the first optical system.

The present invention provides a camera comprising a cylindrical member supported freely rotatively, a constraining member for constraining the cylindrical member to rotate unidirectionally, a rotary member to be rotated responsive to a movement for varying powers made by a first optical system, a belt member for conveying the rotational motion of the rotary member to the cylindrical member so as to drive the cylindrical member, and a second optical system whose power is varied with the rotation of the cylindrical member.

These as well as other objects and advantages of the present invention will be further apparent from the detailed description below.

DETAILED DESCRIPTION OF THE PREFERRED EMBODIMENTS

An embodiment of the present invention will be described with reference to the drawings.

FIGS. 1 to 26 show an embodiment of the present invention.

Figure 1:
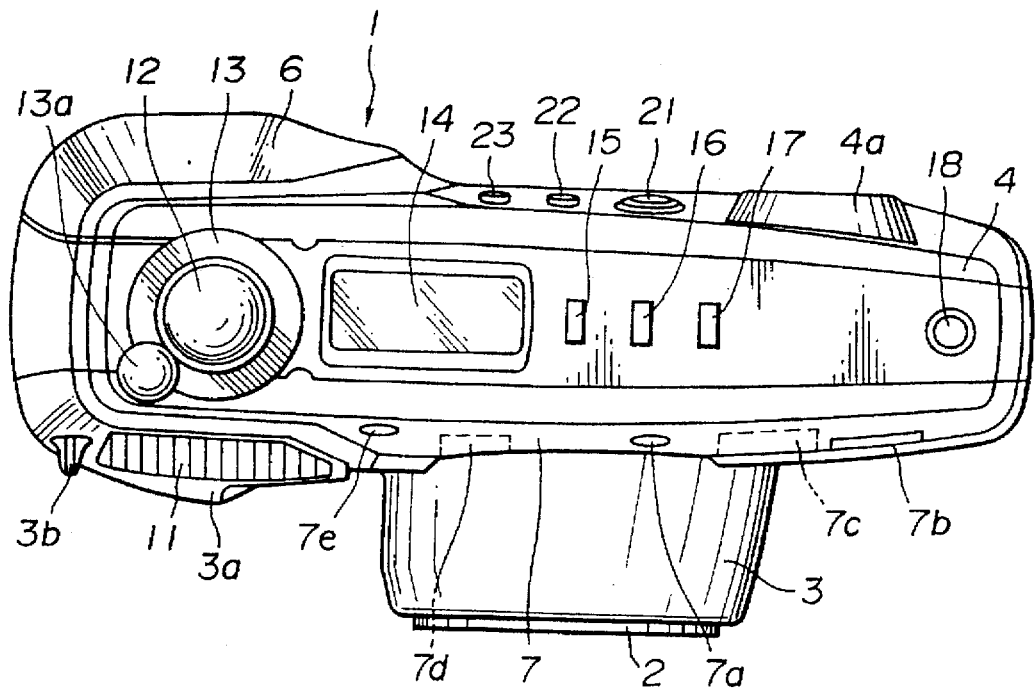
FIG. 1 is a plan view showing a camera of an embodiment of the present invention.
Figure 2:
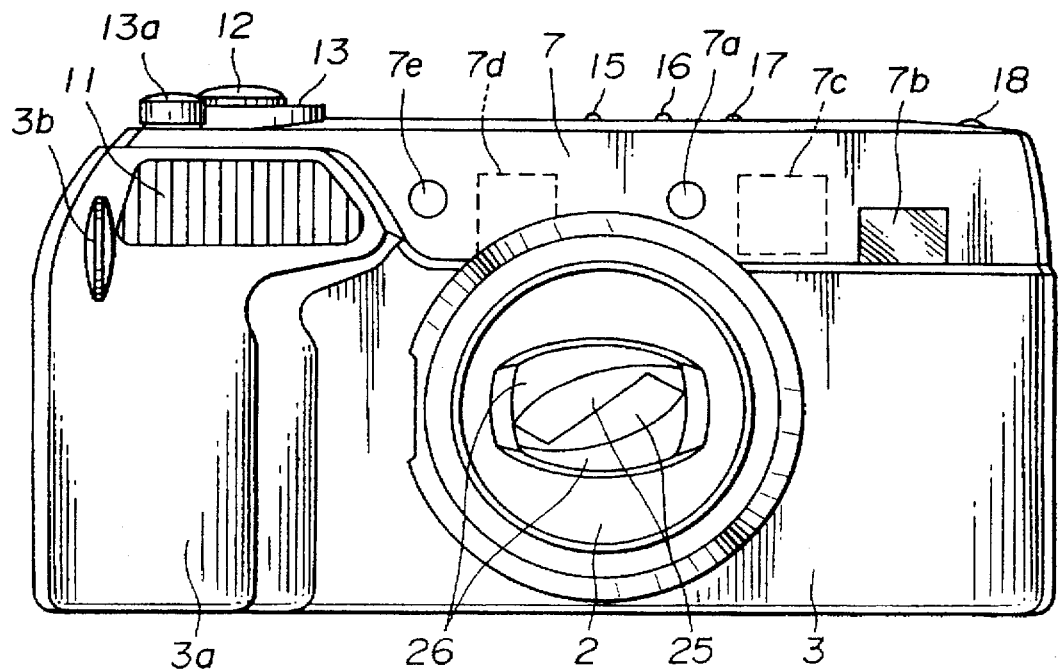
FIG. 2 is a front view showing the camera of the embodiment of FIG. 1.

A camera 1 has an appearance shown in FIGS. 1 and 2. The front side of the camera 1 is shielded with a front cover 3, and the back side thereof is shielded with a back cover 4. A lens frame 2 is formed in the center of the front side of the front cover 3. A casing panel 7 is mounted above the lens frame 2. A back lid 6 is mounted on the back side so as to open or close freely.

The front cover 3 is a member for shielding component members incorporated in a camera body from ahead, having a grip 3a shaped to be gripped to hold the camera 1 and formed on the left-hand end of the front cover 3. A strobe window 11 that is a transparent panel with a strobe flash bulb incorporated is formed above the grip 3a. A boss 3b for use in preventing an operator's fingers from blocking the strobe window 11 during photography is located by the left side of the strobe window 11. In the left part of the top of the front cover 3, a release button 12 is formed to actuate a release operation. A zoom dial 13 is formed around the release button 12. Zooming is effected by rotating the zoom dial 13 clockwise or counterclockwise with the release button 12 as a rotation center while abutting fingers on a boss 13a. An LCD window 14 that is a transparent window of an LCD is located on the right-hand side of the release button 12. Operation buttons 15, 16, and 17 for use in designating various modes of the camera are set in an array on the right hand of the LCD window 14. A panorama button 18 for use in switching between a panoramic photography mode and a normal photography mode is located at the right-hand end of the top of the camera.

The lens frame 2 is a cylindrical frame member for supporting a photographing lens array which is not shown. Lens barriers 25 and 26 are formed in a lens opening ahead of the lens frame 2 along the optical axis. The lens barriers 25 and 26 open to allow a light beam reflected from an object to pass through for photography, while closing to shelter the photographing lens array while the camera is being carried.

The back cover 4 is a casing member for shielding the back side of the camera, having a projection 4a for shielding a viewfinder eyepiece unit formed in the right upper part thereof. A Power button 21 for turning on or off the power supply of the camera and operation buttons 22 and 23 for designating various camera modes are located in the upper part of the back cover 4.

The back lid 6 is a lid member located in the back of the camera, which is used for loading or unloading film.

The casing panel 7 that is a transparent member is fixed to the front cover 3 using an adhesive or by performing deposition. The casing panel 7 is one of a group of members constituting the appearance of the camera. The casing panel 7 has an interceptive coating film that is formed as part of the surface of the transparent member by performing injection molding. The casing panel 7 has a viewfinder incident window 7b and a photometric window 7a on the upper right-hand side of the lens frame 2. These windows 7b and 7a are transparent because they do not have their surfaces coated with the interceptive coating film. An automatic-focusing (hereinafter, AF) light projecting window 7c is interposed between the viewfinder incident window 7b and photometric window 7a, and an AF light receiving window 7d is located not immediately above but rather on the left-hand side of the lens frame 2. The AF light projecting and receiving windows 7c and 7d are coated with an interceptive coating characteristic of transmitting only infrared light. A self-timer LED window 7e is located by the left side of the AF light receiving window 7d, which is coated with an interceptive coating characteristic of transmitting red light. When a self-timer is in operation, lighting of a built-in LED can be observed externally.

Figure 3:
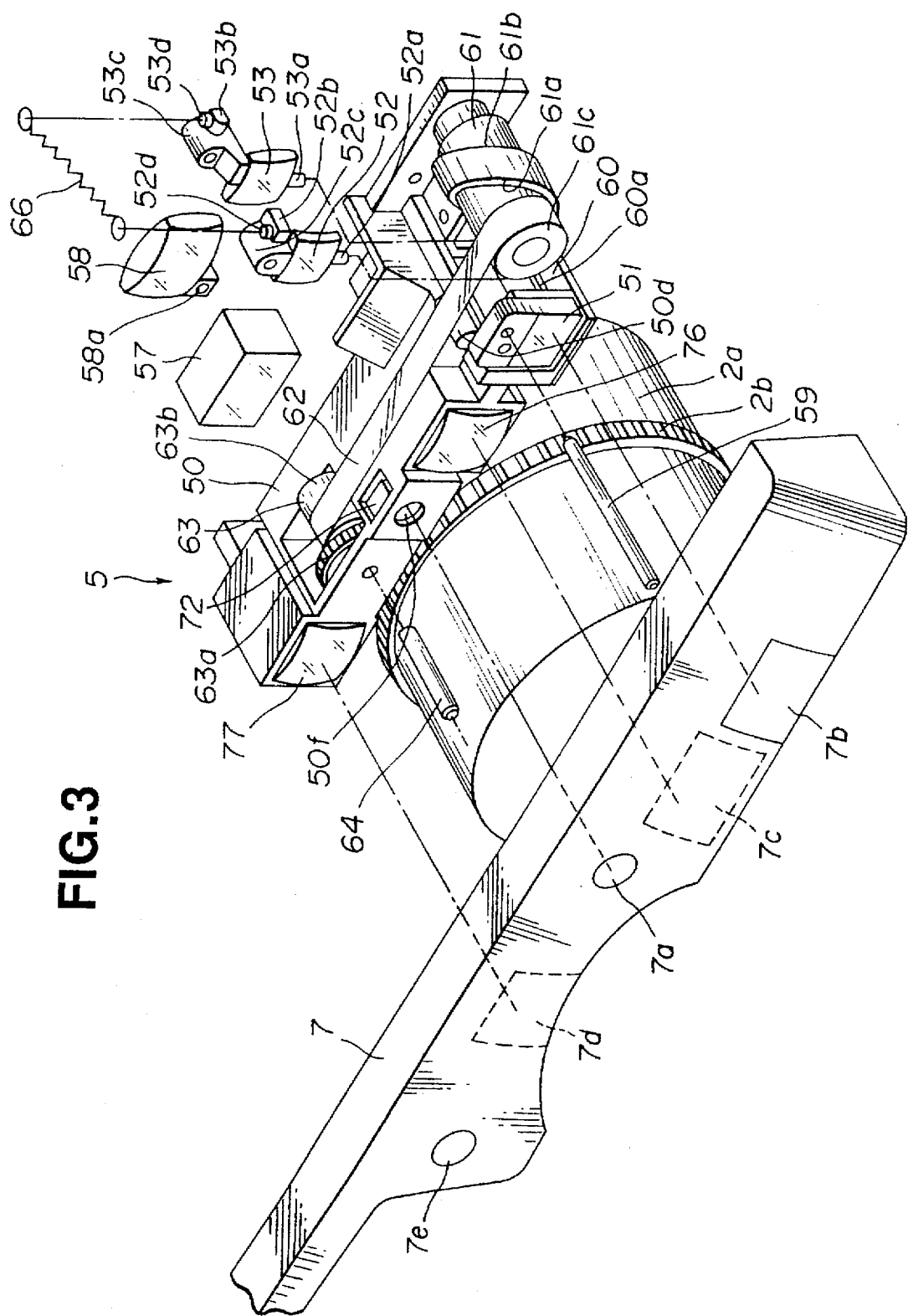
FIG. 3 is an exploded oblique view showing a viewfinder, a casing panel, and a rotary frame in the embodiment of FIG. 1.

FIG. 3 is an oblique view showing a structure of a viewfinder.

Behind the casing panel 7 along the optical axis in the camera, as shown in FIG. 3, a viewfinder 5 is located at a position above a rotary frame 2a that is one of component members of the lens frame 2. The viewfinder 5 is composed of various units or component members such as a photometry unit, an AF light projector, an AF light receiver, a viewfinder optical system, and a viewfinder zooming drive mechanism which are incorporated in a viewfinder structure member 50 serving as a frame member.

The photometry unit is located behind the photometric window 7a on the casing panel 7 along the optical axis, and is composed of a photometric hole 50f bored substantially in the center of the front side of the viewfinder structure member 50, and a photometric light receiving element 72 serving as a light receiving means and lying behind the photometric hole 50f along the optical axis.

The AF light projector is located behind the AF light projecting window 7c on the casing panel 7 along the optical axis, and is composed of an AF light projecting lens 76 fixed to the viewfinder structure member 50, and an AF light projecting LED, which is not shown, located behind the AF light projecting lens 76 and along the optical axis.

The AF light receiver is located behind the AF light receiving window 7d on the casing panel 7 along the optical axis, and is composed of an AF light receiving lens 77 fixed to the viewfinder structure member 50 and an AF light receiving element, which is not shown, located behind the AF light receiving lens 77 and along the optical axis.

The viewfinder optical system is composed of viewfinder objective lenses described below.

A stationary objective lens 51 is located behind the viewfinder incident window 7b on the casing panel 7 along the optical axis, and is securely positioned at the right-hand end in the front side of the viewfinder structure member 50.

A light beam emanating from the stationary objective lens 51 enters a first variable-power lens 52 located behind the stationary objective lens 51 and along the optical axis. The first variable-power lens 52 loads an axis-hole section 52c with a cam follower 52b attached, and has a downwardly projecting rotation stopper 52a. The first variable-power lens 52 is thus supported by a viewfinder objective lens sliding axis pin 59 serving as a guide axis owing to the axis-hole section 52c, and lens 52 can slide in the optical-axis direction owing to the rotation stopper 52a fitted into a fitting ditch or groove 60a bored in a viewfinder lens base 60.

A light beam emanating from the first variable-power lens 52 enters a second variable-power lens 53. The second variable-power lens 53 loads an axis-hole section 53c with a cam follower 53b attached, and has a downwardly projecting rotation stopper 53a. The second variable-power lens 53 is thus supported by the viewfinder objective lens sliding axis pin 59 owing to the axis-hole section 53c, and lens 53 can slide in the optical-axis direction owing to the rotation stopper 53a fitted into the fitting ditch or groove 60a bored in the viewfinder lens base 60.

After passing through a first prism 54 and a second prism 56 (See FIG. 4), which will be described later, the light beam enters an eyepiece variable-power lens 57. The eyepiece variable-power lens 57 is designed to increase the power of a viewfinder field of a panoramic or trimmed picture size and be freely movable as will be described later.

An optical image passing through the eyepiece variable-power lens 57 enters a stationary eyepiece lens 58. The stationary eyepiece lens 58 has a downwardly projecting mounting section 58a. When a stationary axis pin 50f (See FIG. 15) is inserted into the mounting section 58a, the stationary eyepiece lens 58 is positioned securely to the viewfinder structure member 50.

Constraining means attaching sections 52d and 53d are formed on the cam followers 52b and 53b of the first and second variable-power lenses 52 and 53. A second constraining means 66 is attached to the constraining means attaching sections 52d and 53d, whereby the first variable-power lens 52 and second variable-power lens 53 are constrained to move in a direction in which tension is applied. The cam followers 52b and 53b are therefore constrained to such a motion that causes the cam followers 52b and 53b to abut on cams 61a and 61b.

A viewfinder zooming drive mechanism for driving the aforesaid viewfinder optical system for zooming has components described below.

A rotary member 63 is made by coupling a gear 63a and a drive belt wind 63b coaxially, and rotatively supported by a rotary member axis pin 64. When the gear 63a engages with a gear 2b formed on the circumference of the rotary frame 2a of the lens frame 2, the rotational motion of the rotary frame 2a is conveyed to the cam member 61, whereby the viewfinder optical system undergoes a zooming movement.

A drive belt 62 is selectively wound up about either the rotary member 63 or cam member 61 so as to convey the rotational motion of either the rotary member 63 to cam member 61 or vice versa. The ends of the drive belt 62 are respectively fixed to the drive belt wind 63b of the rotary member 63 and a drive belt wind 61c of the cam member 61. The driving force of the drive belt 62 in one direction is supplied from the rotational driving motion of the rotary frame 2, while the driving force thereof in the opposite direction is supplied from a constraining force of a first constraining means 65 (See FIG. 4). When the diameters of the drive belt wind 63b and drive belt wind 61c are set to different values, a reduction ratio can be set to any value. The drive belt 62 is confined to a certain position by means of a belt position confiner 50d of the viewfinder structure member 50.

As mentioned above, the photometry unit and AF light projector are surrounded by the drive belt 62, rotary frame 2a, and lenses of the viewfinder. Thus, spaces are utilized efficiently in order to realize a small-sized camera body.

The cam member 61 is rotative supported by a cam member axis pin 50e (See FIG. 4) with a spacer 50f projecting ahead from the right end of the viewfinder structure member 50. The cam member 61 has the cams 61a and 61b formed on the circumference thereof on which the cam follower 52b of the first variable-power lens 52 and the cam follower 53b of the second variable-power lens 53 respectively abut. The circumference at the front end of the cam member 61 serves as the drive belt wind 61c to which one end of the drive belt 62 is fixed.

The rotary member 63 and cam member 61 are thus connected via the drive belt 62. Even when the viewfinder optical system is laid out to be away from the lens frame 2, the viewfinder optical system is still interlocked with the lens frame 2. Furthermore, since the photometry unit and AF unit can be interposed between the rotary member 63 and cam member 61, components can be laid out more freely and neatly. This results in a small-sized camera body.

Figure 4:
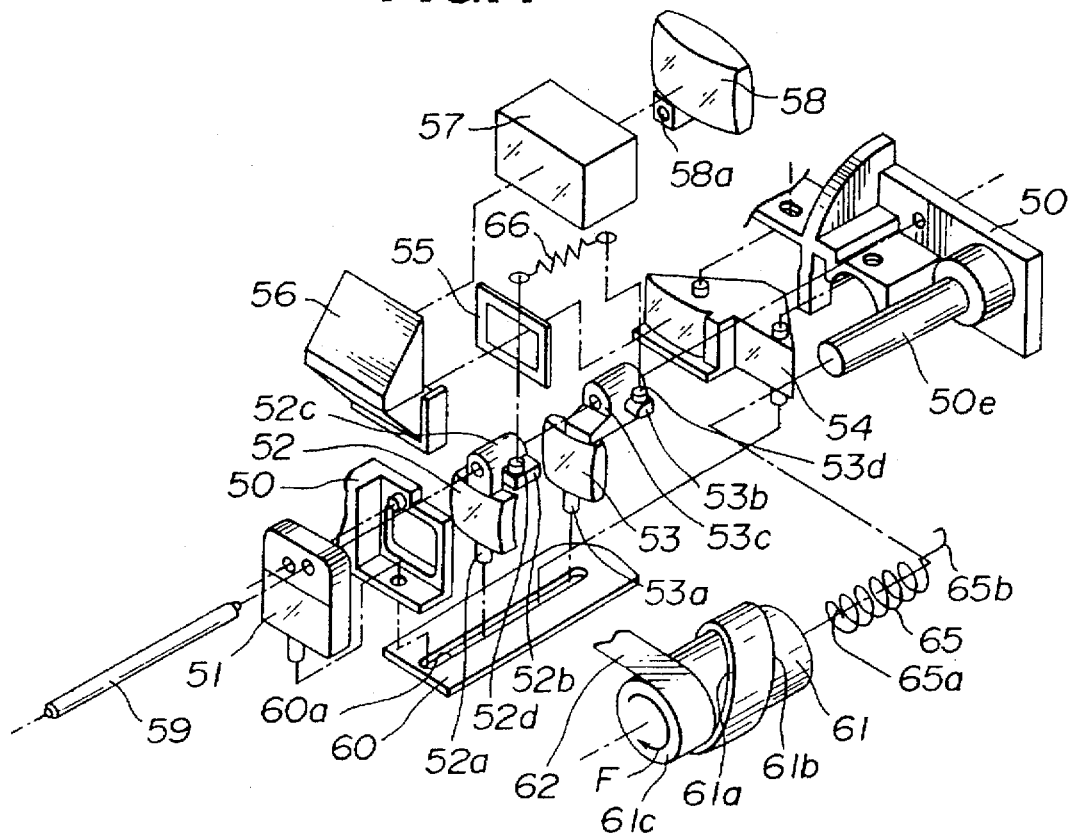
FIG. 4 is an exploded oblique view showing components of a viewfinder optical system in the viewfinder of the embodiment of FIG 1.
Figure 5:
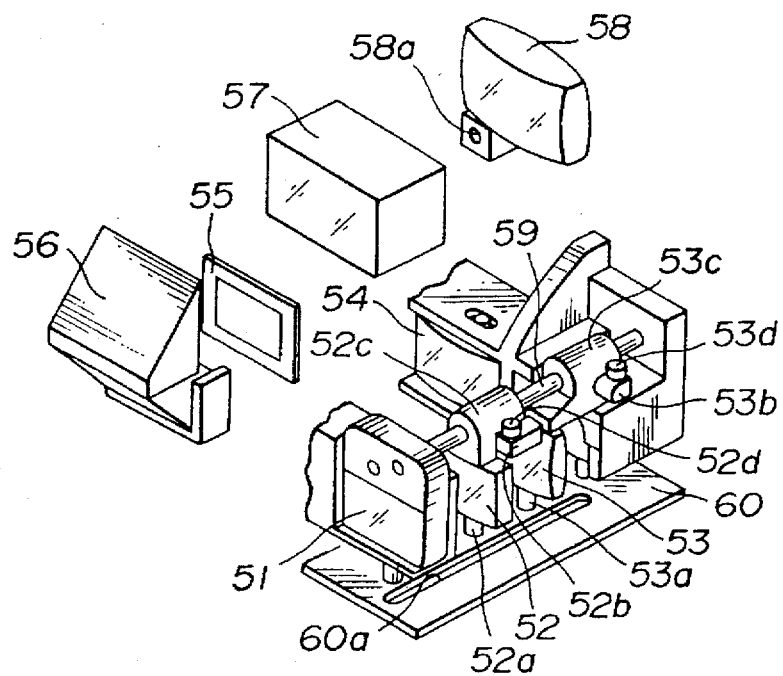
FIG. 5 is an exploded oblique view showing the viewfinder optical system of the embodiment of FIG. 1 with some components assembled.

FIG. 4 is an oblique view showing an arrangement of lenses in a viewfinder. FIG. 5 is an oblique view in which the viewfinder objective lenses and first prism are assembled.

The first prism 54 that is a stationary prism reflects a light beam emanating from the viewfinder objective lenses laterally so as to cause the light beam to make a U-turn. The first prism 54 is mounted in the viewfinder structure member 50.

A field mask 55 is a member defining a field frame of a normal-mode picture size. The field mask 55 lies on an image formation plane in the viewfinder optical system and is positioned while being interposed between the first prism 54 and a second prism 56.

The second prism 56 reflects a light beam emanating from the first prism 54 vertically so as to cause the light beam to make a U-turn. The second prism 56 is positioned relative to the viewfinder structure member 50 and first prism The viewfinder lens base 60 serving as a rotation restraining member is a plate member having the fitting ditch 60a or groove bored in parallel with the optical axis, and positioned with both ends thereof retained by the stationary objective lens 51 and first prism 54. The rotation stopper 52a of the first variable-power lens 52 and the rotation stopper 53a of the second variable-power lens 53 are, as mentioned above, fitted into the fitting ditch 60a, thus restraining the first and second variable-power lenses 52 and 53 from rotating about the viewfinder object lens sliding axis pin 59.

The first constraining means 65 is, for example, a coil spring respectively having a stationary arm 65a and a movable arm 65b at opposite end thereof. The stationary arm 65a is fixed to the cam member axis pin 50e of the viewfinder structure member 50, while the movable arm 65b is fixed to the cam member 61. The first constraining means 65 constantly urges the cam member 61 toward rotation in an arrow-F direction, thus driving the cam member 61. Thus, even when the cam member 61 is at a halt, the drive belt 62 will not loosen and dangle.

Figure 6:
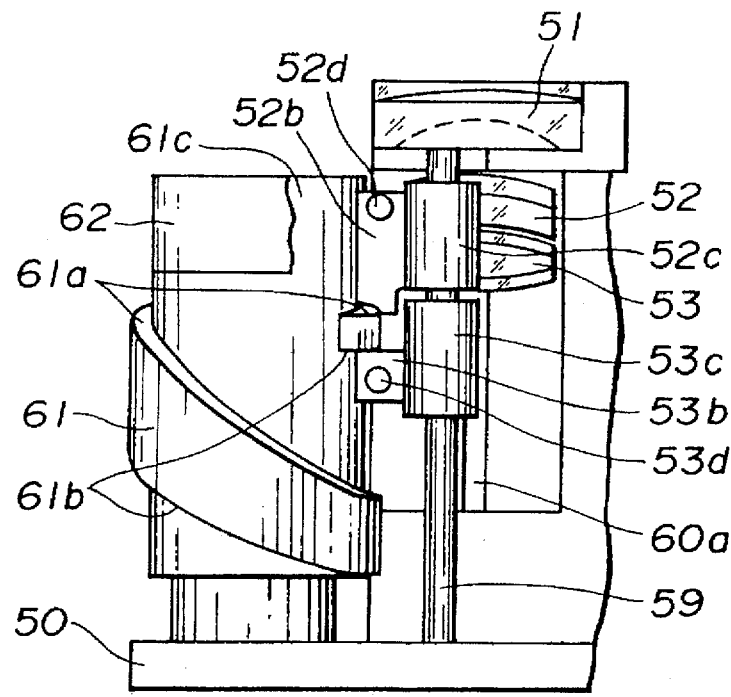
FIG. 6 is a plan view showing a cam member, a first variable-power lens, and a second variable-power lens which are interlocked with one another in a telephoto mode of the embodiment of FIG. 1.
Figure 7:
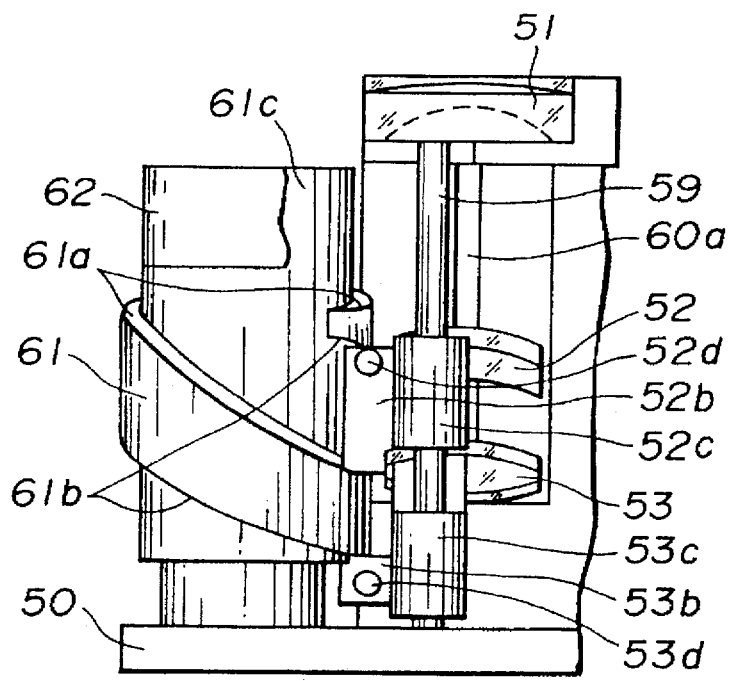
FIG. 7 is a plan view showing the cam member, first variable-power lens, and second variable-power lens which are interlocked with one another in a wide-angle mode of the embodiment of FIG. 1.

FIG. 6 is a plan view showing the objective lenses and cam member in a telephoto mode. FIG. 7 is a plan view showing the objective lenses and cam member in a wide-angle mode.

As illustrated, the end of the first variable-power lens 52 behind the cam follower 52b along the optical axis is in contact with the cam 61a of the cam member 61. The end or the second variable-power lens 53 ahead of the cam follower 53b along the optical axis is in contact with the cam 61b.

When the cam member 61 rotates owing to rotation of the rotary member 63 and winding of drive belt 62 with the rotation of the rotary frame 2a, the first variable-power lens 52 and second variable-power lens 53 move along the cams 61a and 61b in the optical-axis direction. At this time, the rotation stoppers 52a and 53a are fitted into the fitting ditch 60a in the viewfinder lens base 60 in order to restrain the first variable-power lens 52 and second variable-power lens 53 from rotating about the viewfinder objective lens sliding axis 59 with the engagements between the cams 61a and 61b and the cam followers 52b and 53b.

FIGS. 8 to 14 are sectional views showing the first seventh examples of a structure for improving the precision in positioning a viewfinder optical system having a zoom function. For application to a camera, an optimal one of the examples should be selected in consideration of lens performance and assembling efficiency.

Figure 8:
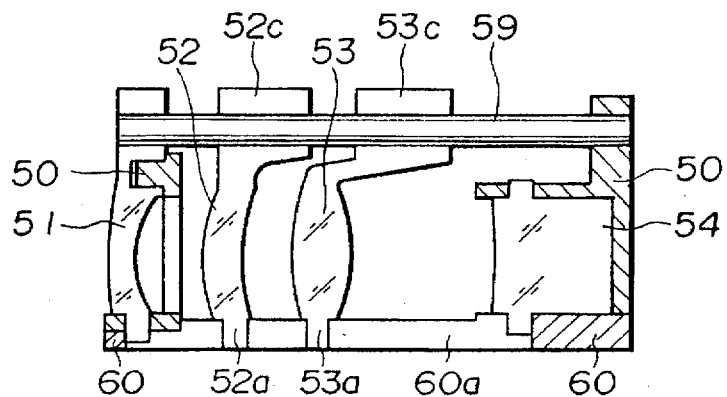
FIG. 8 is a sectional view showing a first example of a structure for improving the precision in positioning a viewfinder optical system having a zoom function in the embodiment of FIG. 1.

In the first example of FIG. 8, the viewfinder objective lens sliding axis pin 59 has opposite ends thereof respectively supported by the stationary objective lens 51 located forwardly along the optical axis and the viewfinder structure member 50 located rearwardly along the optical axis. The viewfinder lens base 60 is positioned with both opposite ends thereof respectively retained by the stationary objective lens 51 and first prism 54. The objective lens 51 and first prism 54 are secured to the viewfinder structure member 50. This structure ensures higher precision in determining the positions of the viewfinder objective lens sliding axis pin 59 and the fitting ditch 60 in the viewfinder lens base 60 relative to the stationary objective lens 51 as well as the position of the fitting ditch 60a in the viewfinder lens base 60 relative to the first prism 54. Consequently, the positions of the first variable-power lens 52 and second variable-power lens 53 relative to the stationary objective lens 51 and first prism 54 can be determined highly precisely.

When an attempt is made to realize a small-sized viewfinder for zooming, the relative positions of lenses must be determined with the highest possible precision. According to the structure shown in FIG. 8, it is possible to improve the precision in determining the positions of the first variable-power lens 52 and second variable-power lens 53 relative to the stationary objective lens 51 and first prism 54. This enables realization of a small-sized viewfinder optical system, resulting in a small-sized camera. Furthermore, since the viewfinder optical system is constructed with high precision, the optical axis will not deviate. This results in a viewfinder having alleviated adverse effects such as aberration and thereby permitting better discernment.

FIGS. 9 to 14 show another examples of the structure shown in FIG. 8.

Figure 9:
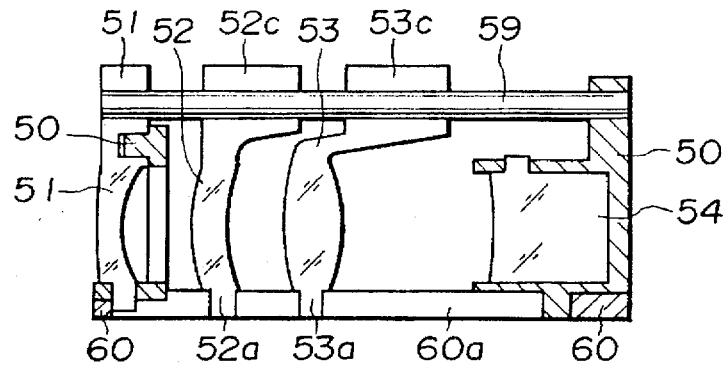
FIG. 9 is a sectional view showing a second example of the structure for improving the precision in positioning a viewfinder optical system having a zoom function in the embodiment of FIG. 1.

In the second example shown in FIG. 9, the viewfinder objective lens sliding axis pin 59 has opposite ends thereof respectively supported by the stationary objective lens 51 located forwardly along the optical axis and the viewfinder structure member 50 located rearwardly along the optical axis. The viewfinder lens base 60 is positioned with opposite ends thereof respectively retained by the stationary objective lens 51 and viewfinder structure member 50. The objective lens 51 and first prism 54 are positioned securely to the viewfinder structure member 50. This structure ensures higher precision in determining the positions of the viewfinder object lens sliding axis pin 59 and fitting ditch 60a relative to the stationary objective lens 51. The positions of the first variable-power lens 52 and second variable-power lens 53 relative to the stationary objective lens 51 can therefore be determined highly precisely. The other components are arranged in the same manner as those shown in FIG. 8.

Figure 10:
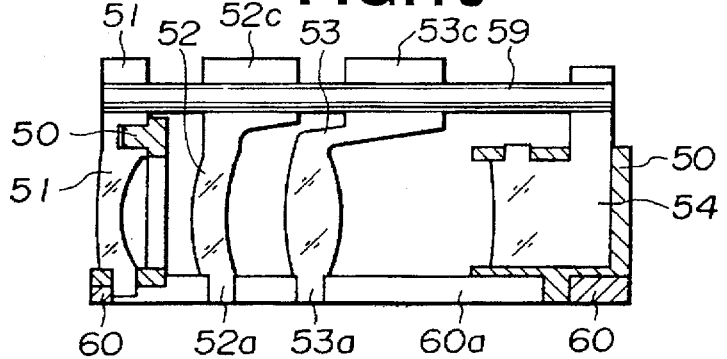
FIG. 10 is a sectional view showing a third example of the structure for improving the precision in positioning a viewfinder optical system having a zoom function in the embodiment of FIG. 1.

In the third example shown FIG. 10, the viewfinder objective lens sliding axis pin 59 has opposite ends thereof respectively supported by the stationary objective lens 51 located forwardly along the optical axis and the first prism 54 located rearwardly along the optical axis. The viewfinder lens base 60 is positioned with opposite ends thereof respectively retained by the stationary objective lens 51 and viewfinder structure member 50. The stationary objective lens 51 and first prism 54 are positioned securely to the viewfinder structure member 50. This structure ensures higher precision in determining the positions of the viewfinder objective lens sliding axis pin 59 and fitting ditch 60a relative to the stationary objective lens as well as the position of the viewfinder objective lens sliding axis pin 59 relative to the first prism 54. The positions of the first variable-power lens 52 and second variable-power lens 53 relative to the stationary objective lens 51 and first prism 54 can therefore be determined highly precisely. The other components are arranged in the same manner as those shown in FIG. 8.

Figure 11:
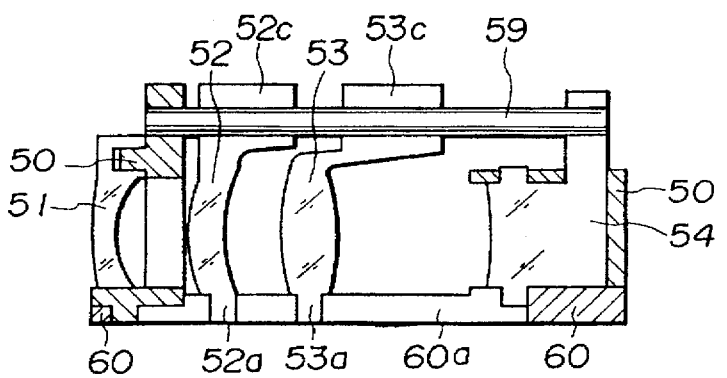
FIG. 11 is a sectional view showing a fourth example of the structure for improving the precision in positioning a viewfinder optical system having a zoom function in the embodiment of FIG. 1.

In the fourth example shown in FIG. 11, the viewfinder objective lens sliding axis pin 59 has opposite ends thereof respectively supported by the viewfinder structure member 50 located forwardly along the optical axis and the first prism 54 located rearwardly along the optical axis. The viewfinder lens base 60 is positioned with opposite ends thereof respectively retained by the viewfinder structure member 50 and first prism 54. The stationary objective lens 51 and first prism 54 are positioned securely to the viewfinder structure member 50. This structure ensures higher precision in determining the positions of the viewfinder objective lens sliding axis pin 59 and fitting ditch 60a relative to the first prism 54. The positions of the first variable-power lens 52 and second variable-power lens 53 relative to the first prism 54 can therefore be determined highly precisely. The other components are arranged substantially in the same manner as those shown in FIG. 8.

Figure 12:
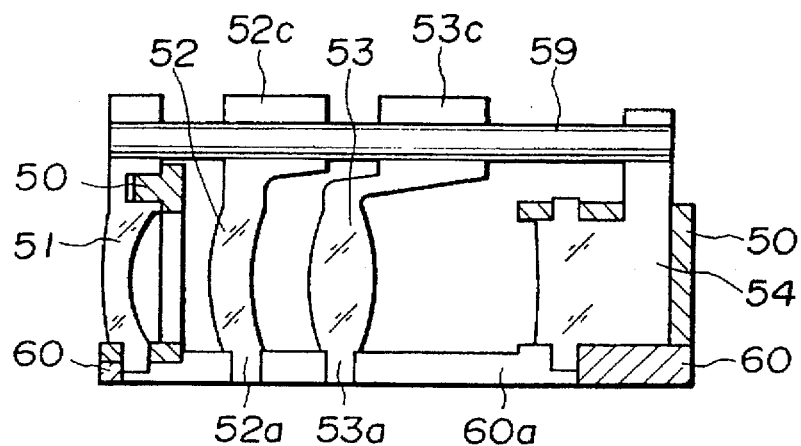
FIG. 12 is a sectional view showing a fifth example of the structure for improving the precision in positioning a viewfinder optical system having a zoom function in the embodiment of FIG. 1.

In the fifth example shown in FIG. 12, the viewfinder objective lens sliding axis pin 59 has opposite ends thereof respectively supported by the stationary objective lens 51 located forwardly along the optical axis and the first prism 54 located rearwardly along the optical axis. The viewfinder lens base 60 is positioned with opposite ends thereof respectively retained by the stationary objective lens 51 and first prism 54. The stationary objective lens 51 and first prism 54 are positioned securely to the viewfinder structure member 50. This structure ensures higher precision in determining the positions of the viewfinder objective lens sliding axis pin 59 and fitting ditch 60a relative to the stationary objective lens 51 as well as the positions of the viewfinder objective lens sliding axis pin 59 and fitting ditch 60a relative to the first prism 54. The positions of the first variable-power lens 52 and second variable-power lens 53 relative to the stationary objective lens 51 and first prism 54 can therefore be determined highly precisely. The other components are arranged substantially in the same manner as those shown in FIG. 8.

Figure 13:
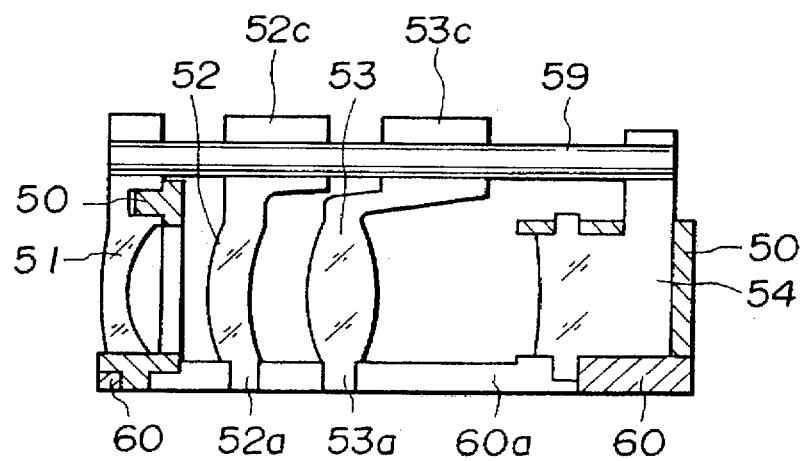
FIG. 13 is a sectional view showing a sixth example of the structure for improving the precision in positioning a viewfinder optical system having a zoom function in the embodiment of FIG. 1.

In the sixth example shown in FIG. 13, the viewfinder objective lens sliding axis pin 59 has opposite ends thereof respectively supported by the stationary objective lens 51 located forwardly along the optical axis and the first prism 54 located rearwardly along the optical axis. The viewfinder lens base 60 is positioned with opposite ends thereof respectively retained by the viewfinder structure member 50 and first prism 54. The stationary objective lens 51 and first prism 54 are positioned securely to the viewfinder structure member 50. This structure ensures higher precision in determining the position of the viewfinder objective lens sliding axis pin 59 relative to the stationary objective lens 51 as well as the positions of the viewfinder objective lens sliding axis pin 59 and fitting ditch 60a relative to the first prism 54. The positions of the first variable-power lens 52 and second variable-power lens 53 relative to the stationary objective lens 51 and first prism 54 can therefore be determined highly precisely. The other components are arranged substantially in the same manner as those shown in FIG. 8.

Figure 14:
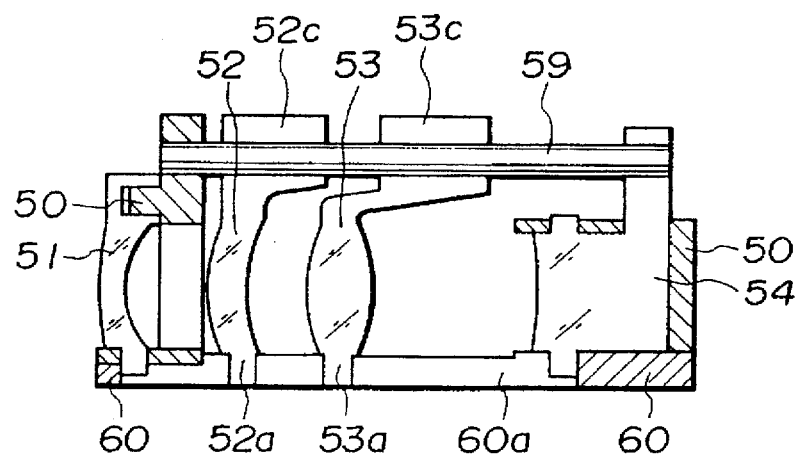
FIG. 14 is a sectional view showing a seventh example of the structure for improving the precision in positioning a viewfinder optical system having a zoom function in the embodiment of FIG. 1.

In the seventh example shown in FIG. 14, the viewfinder objective lens sliding axis pin 59 has opposite ends thereof respectively supported by the viewfinder structure member 50 located forwardly along the optical axis and the first prism 54 located rearwardly along the optical axis. The viewfinder lens base 60 is positioned with opposite ends thereof respectively retained by the stationary object lens 51 and first prism 54. The stationary object lens 51 and first prism 54 are positioned securely to the viewfinder structure member 50. This structure ensures higher precision in determining the position of the fitting ditch 60a relative to the stationary objective lens 51 as well as the positions of the viewfinder objective lens sliding axis pin 59 and fitting ditch 60a relative to the first prism 54. The positions of the first variable-power lens 52 and second variable-power lens 53 relative to the stationary objective lens 51 and first prism 54 can therefore be determined highly precisely. The other components are arranged substantially in the similar manner as those shown in FIG. 8.

Figure 15:
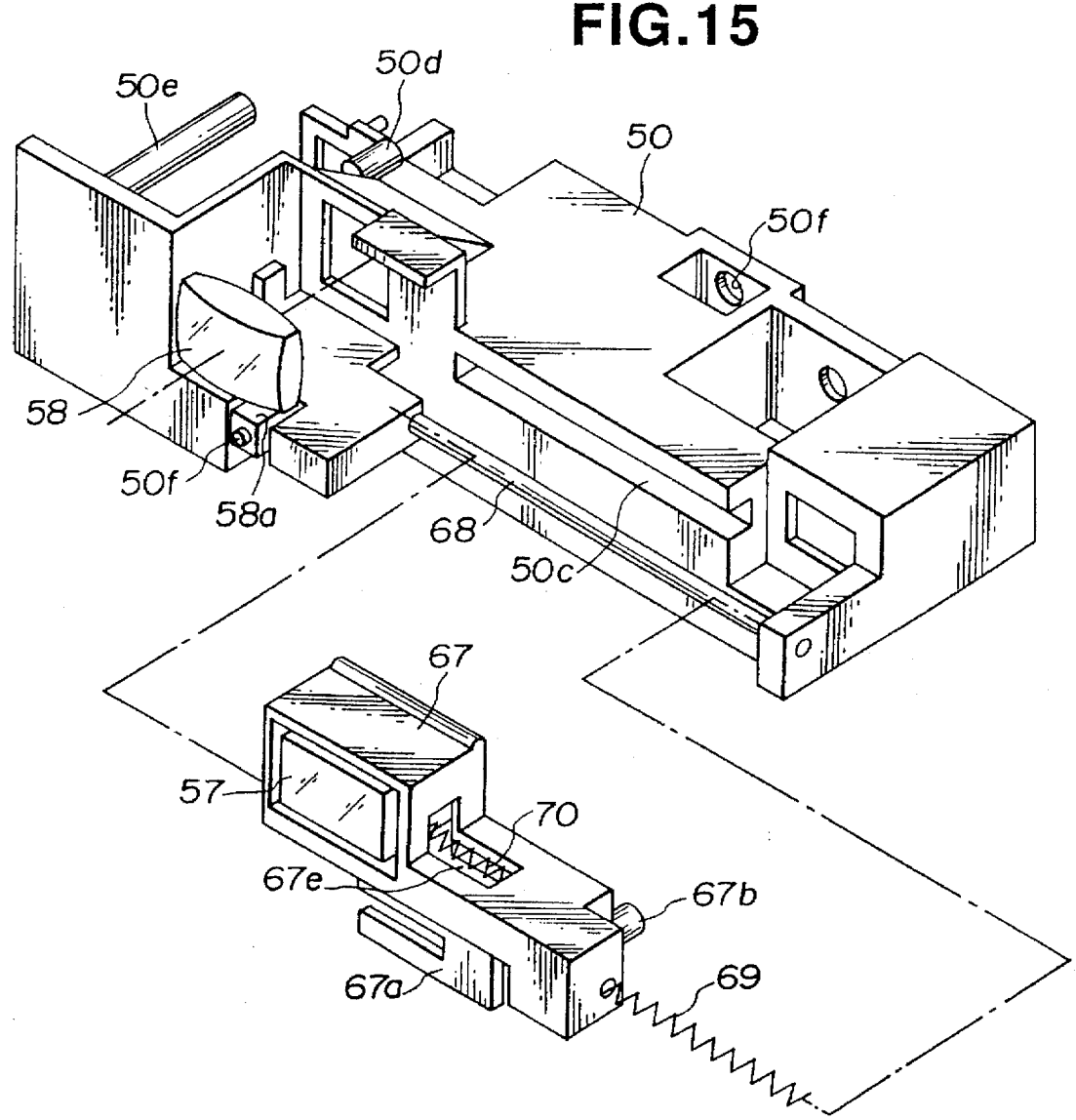
FIG. 15 is an oblique view showing a panoramic-mode setting mechanism in the viewfinder of the embodiment of FIG. 1, viewing the camera from behind.

FIG. 15 is an oblique view showing a structure for a panoramic-mode setting mechanism in a viewfinder, viewing a camera from behind.

The stationary eyepiece lens 58 is positioned owing to a fixing axis pin 50h of the viewfinder structure member 50 and secured to the viewfinder structure member 50. An object image formed near an incident plane of the second prism 56 is observed. In a state shown in FIG. 15, the viewfinder can be looked through with a normal picture size and power.

A panoramic-mode setting axis pin 68 is laid down in a direction orthogonal to the optical axis of the viewfinder with opposite ends thereof fixed to the viewfinder structure member 50.

An eyepiece variable-power lens frame 67 which retains the eyepiece variable-power lens 57, has a viewfinder panoramic field mask 67a, which is elongated and substantially U-shaped turned sideways, united as part thereof. The eyepiece variable-power lens frame 67 is mounted on to the panoramic-mode setting axis pin 68 so as to slide freely. A rotation stopper 67b projecting from one side of the eyepiece variable-power lens frame 67 (FIG. 16) is fitted into a ditch 50c bored substantially in parallel with the panoramic-mode setting axis 68, whereby the eyepiece variable-power lens frame 67 is restrained from rotating about the panoramic-mode setting axis 68.

The eyepiece variable-power lens frame 67 is arranged to lie in front of the stationary eyepiece lens 58 in the viewfinder due to the constraining force of a panoramic-mode setting spring 69 wound about the panoramic-mode setting axis pin 68 and compressed by one arm of the viewfinder structure member 50 and eyepiece variable-power lens frame 67. When the eyepiece variable-power lens frame 67 is inserted, a panoramic picture size is selected and the power of the viewfinder increases. Thus, the viewfinder permits better discernment.

When the eyepiece variable-power lens 57 is arranged to lie in front of the eyepiece lens 58, the power of the viewfinder gets larger. The eyepiece variable-power lens 57 is designed to slide in a direction in which the eyepiece variable-power lens frame 67 moves within the eyepiece variable-lens frame 67, which is pressed leftward by means of a lens constraining spring 70. The lens constraining spring 70 is wound about a pin 67e projecting from the eyepiece variable-power lens frame 67 so as not to bend.

Figure 16:
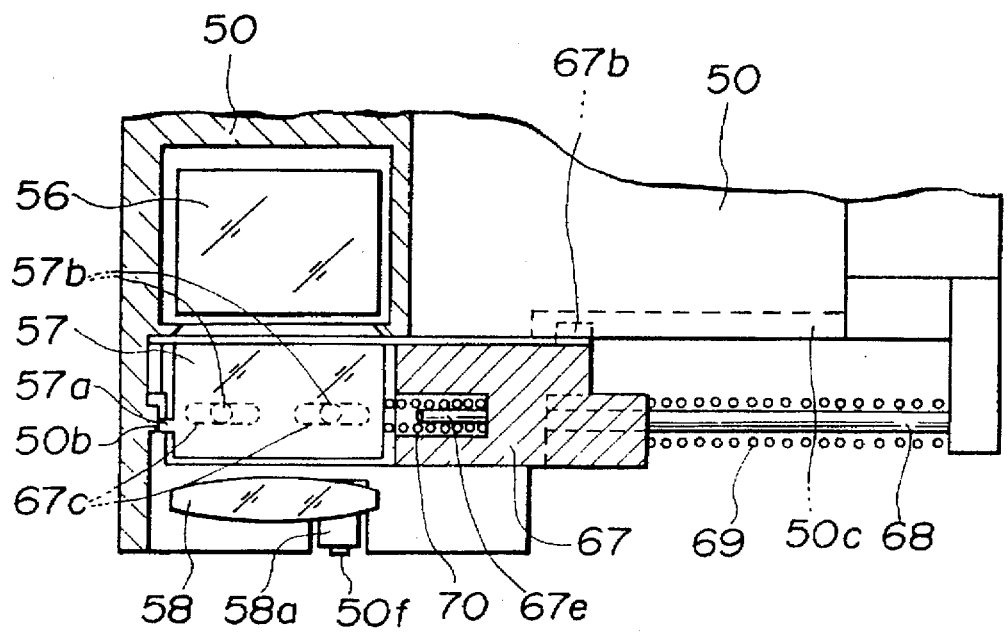
FIG. 16 is a plan sectional view showing the panoramic-mode setting mechanism in the viewfinder of the embodiment of FIG. 1, wherein the viewfinder is set to a panoramic mode.
Figure 17:
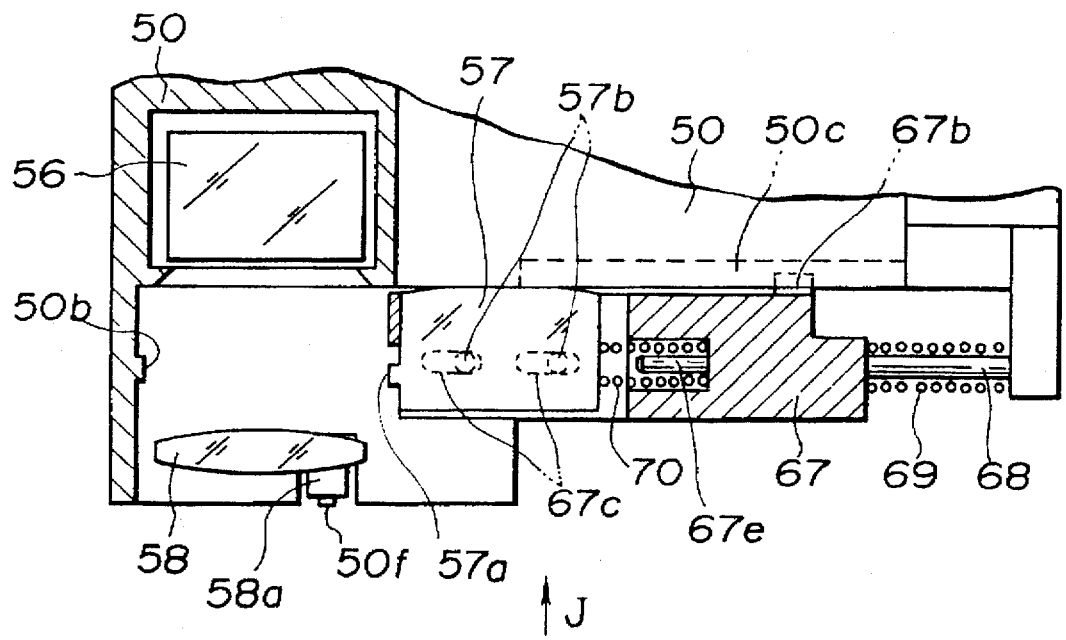
FIG. 17 is a plan sectional view showing the panoramic-mode setting mechanism in the viewfinder of the embodiment of FIG. 1, wherein the viewfinder is set to a normal picture-size mode.

FIGS. 16 and 17 show panoramic-mode setting movements made in the viewfinder. FIG. 16 is a plan sectional view showing the viewfinder in a panoramic mode.

The eyepiece variable-power lens 57 is positioned accurately, because a boss 57a touches a projection 50b of the viewfinder structure member 50 due to the constraining force of the lens constraining spring 70 urging lens 57 toward projection 50b. Thus, the optical axis of the eyepiece variable-power lens 57 is accurately aligned with the optical axis of the viewfinder optical system. The eyepiece variable-power lens 57 has two projections 57b projecting from the bottom thereof. Since the projections 57b are fitted into two elongated holes 67c formed on the eyepiece variable-power lens frame 67 aligned perpendicularly to the optical axis of the viewfinder, the eyepiece variable-power lens 57 is restrained from moving along the optical axis of the viewfinder but can slide in the longitudinal direction of the elongated holes 67c.

The eyepiece variable-power lens frame 67 is constrained to move in a direction in which the eyepiece variable-power lens 57 is inserted by means of the panoramic-mode setting spring 69. Since the spring force of the lens constraining spring 70 is designed to be larger than the spring force one of the panoramic-mode setting spring 69, the eyepiece variable lens frame 67 will not be pushed back due to the spring force of the lens pressing spring 70. A position at which the eyepiece variable-power lens frame 67 is caused to lie can therefore be determined independently of the eyepiece variable-power lens 57.

On the other hand, the viewfinder panoramic field mask 67a need not be positioned precisely even when inserted laterally or in a direction perpendicular to the optical axis of the viewfinder. The panoramic field mask 67a should merely be inserted to lie at a position indicated with reference characters 67a' in FIG. 19. This is because the panoramic field mask 67a which is substantially U-shaped and turned sideways is designed to mask a viewfinder field longitudinally. Incidentally, a lateral portion of the field mask 55 (FIGS. 4 and 19) is employed as a mask for limiting a viewfinder field laterally in the panoramic mode.

FIG. 17 is a partially sectionalized plan view showing a viewfinder in a normal picture-size mode.

When the eyepiece variable-power lens frame 67 is returned from the panoramic-mode state to the state shown in FIG. 17 against the constraining force of the panoramic-mode setting spring 69 by driving a panoramic-mode setting gear 71 (See FIG. 20), the viewfinder panoramic field mask 67a is withdrawn from view. The viewfinder field is returned to a normal picture size. The eyepiece variable-power lens 57 is also withdrawn from view, and the power of the viewfinder is reset to a normal value.

Figure 18:
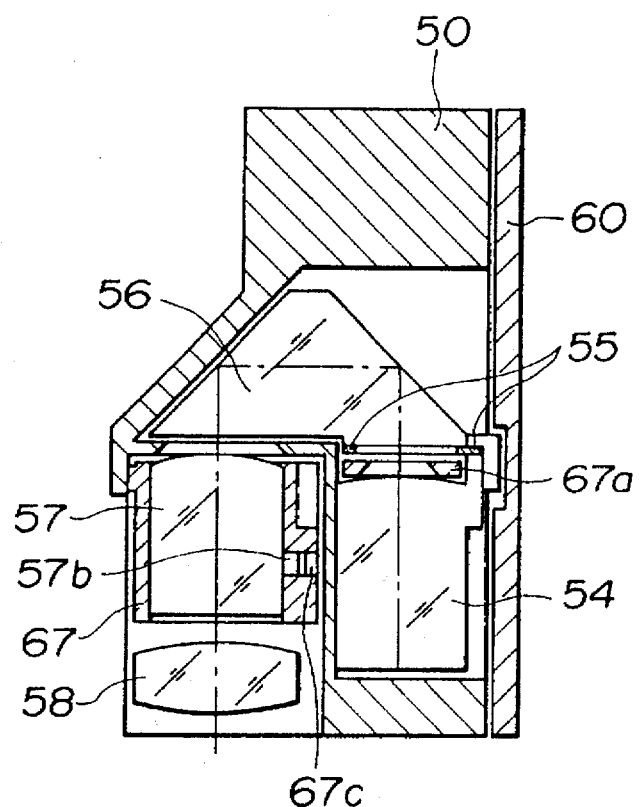
FIG. 18 is a longitudinal sectional view showing the panoramic-mode setting mechanism in the viewfinder of the embodiment of FIG. 1, wherein the viewfinder is set to the panoramic mode.

FIG. 18 is a longitudinal sectional view showing a viewfinder in a panoramic mode.

The viewfinder panoramic field mask 67a is located near to and behind the field mask 55 of a normal picture size lying on the image formation plane in the viewfinder optical system and near to and ahead of the first prism 54. In other words, the viewfinder panoramic field mask 67a is located in the vicinity of the image formation plane for the objective lenses in the viewfinder.

The eyepiece variable-power lens 57 is inserted to lie between the stationary eyepiece lens 58 and second prism 56. The projections 57b are fitted into the elongated holes 67c in the eyepiece variable-power lens frame 67, whereby the eyepiece variable-power lens frame 67 is restrained from moving along the optical axis of the viewfinder but is freely movable in a direction in which the eyepiece variable-power lens 57 moves.

Figure 19:
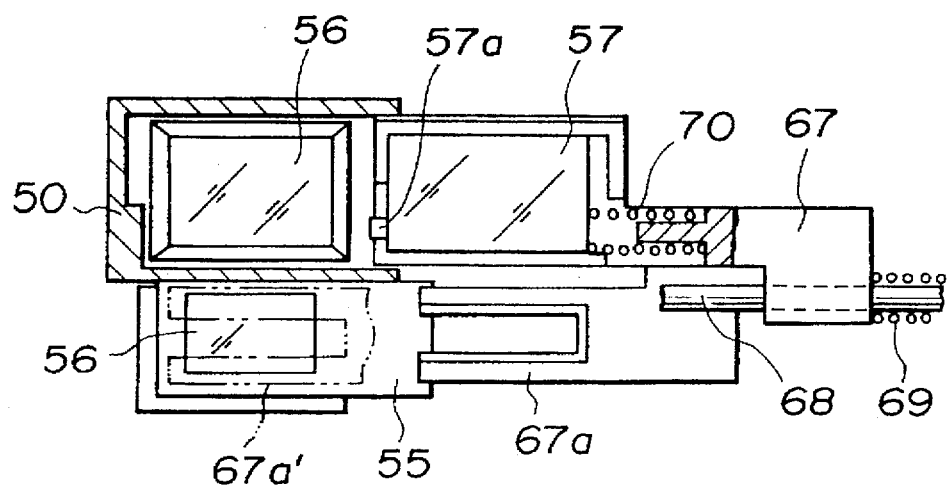
FIG. 19 shows a section of a viewfinder field mask, viewing an eyepiece variable-power lens frame in the arrow-J direction in FIG. 17.

FIG. 19 shows a section of the field mask in the viewfinder, viewing the eyepiece variable-power lens frame 67 shown in FIG. 17 in the arrow-J direction.

The field mask 55 of a normal picture size is, as mentioned above, located in the vicinity of the incident plane of the second prism 56 on the opposite side of the first prism 54. The location coincides with the image formation plane of the viewfinder optical system.

The viewfinder panoramic field mask 67a occupies the position as shown in FIG. 19 in the normal picture-size mode. For panoramic photography, the panoramic field mask 67a moves to the position indicated with reference characters 67a' so as to hide the upper and lower parts of the field mask 55 of a normal picture size.

According to the structure described in conjunction with FIGS. 15 to 21, the eyepiece variable-power lens 57 can be positioned highly precisely independently to the inserted position of the panoramic field mask 67a. The panoramic field mask 67a need not be positioned especially precisely. Nevertheless, the viewfinder can be set to the panoramic mode.

Thus, for panoramic photography, the power at which the viewfinder is looked through is made higher than that for normal picture-size photography. A view provided by the viewfinder image is therefore more discernible and can give almost the same realism as that provided by an enlarged printed image.

In the panoramic mode, areas of film outside a viewfinder field of a panoramic picture size are seen intercepted through a viewfinder. Such photography can therefore be reliably prevented that an object is vignetted by interceptive masks defining a picture size. In addition, the aforesaid simple structure enables both varying the power of a viewfinder and changing the size of a field mask. This results in a small-sized viewfinder and eventually a small-sized camera.

Figure 20:
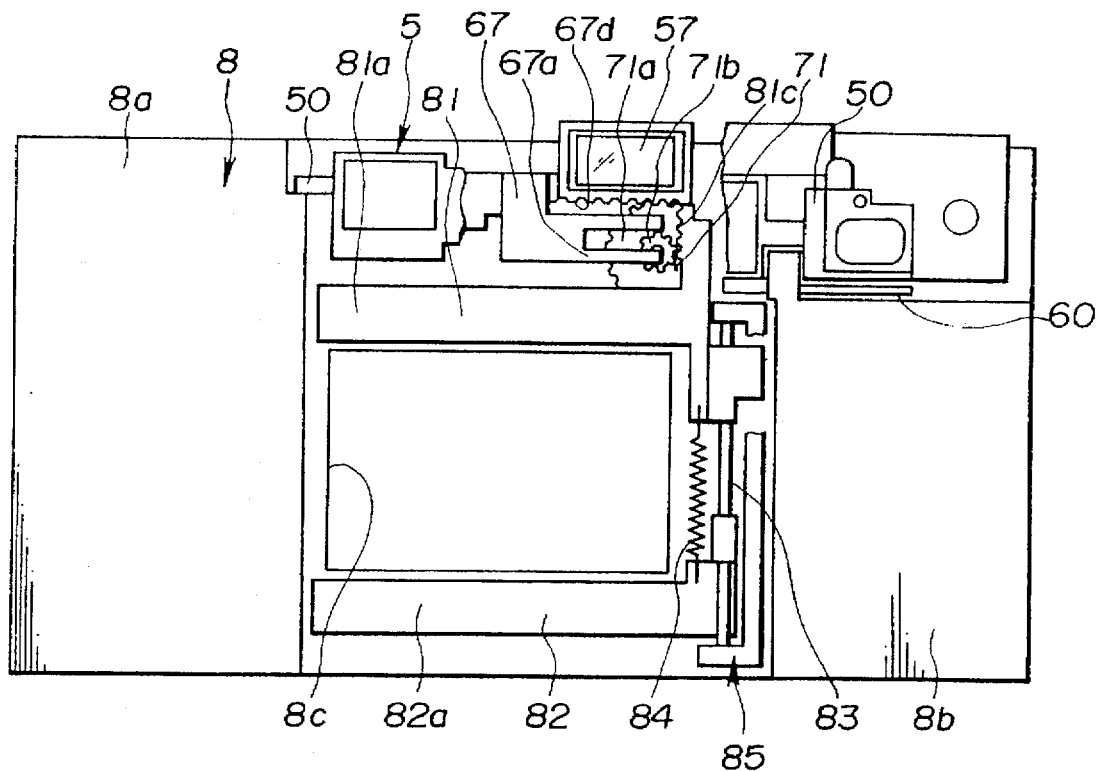
FIG. 20 is a front view showing a camera body in a normal mode, wherein a panoramic-mode setting mechanism and an eyepiece variable-power lens in a viewfinder are interlocked to restrict a picture-size setting opening in the embodiment of FIG. 1.
Figure 21:
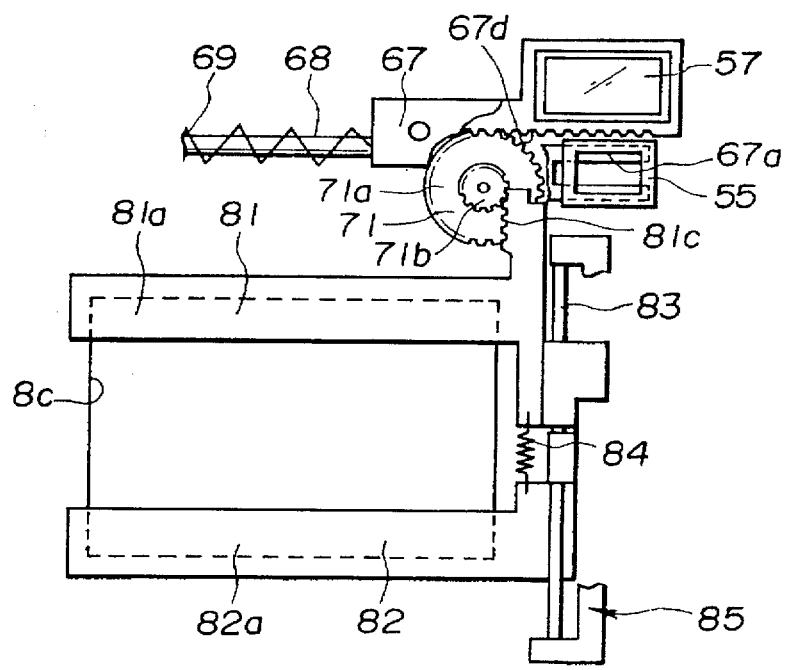
FIG. 21 is a partial front view showing the camera body in the panoramic mode, wherein the panoramic-mode setting mechanism and eyepiece variable-power lens in the viewfinder are interlocked to restrict the picture-size setting opening in the embodiment of FIG. 1.
Figure 22:
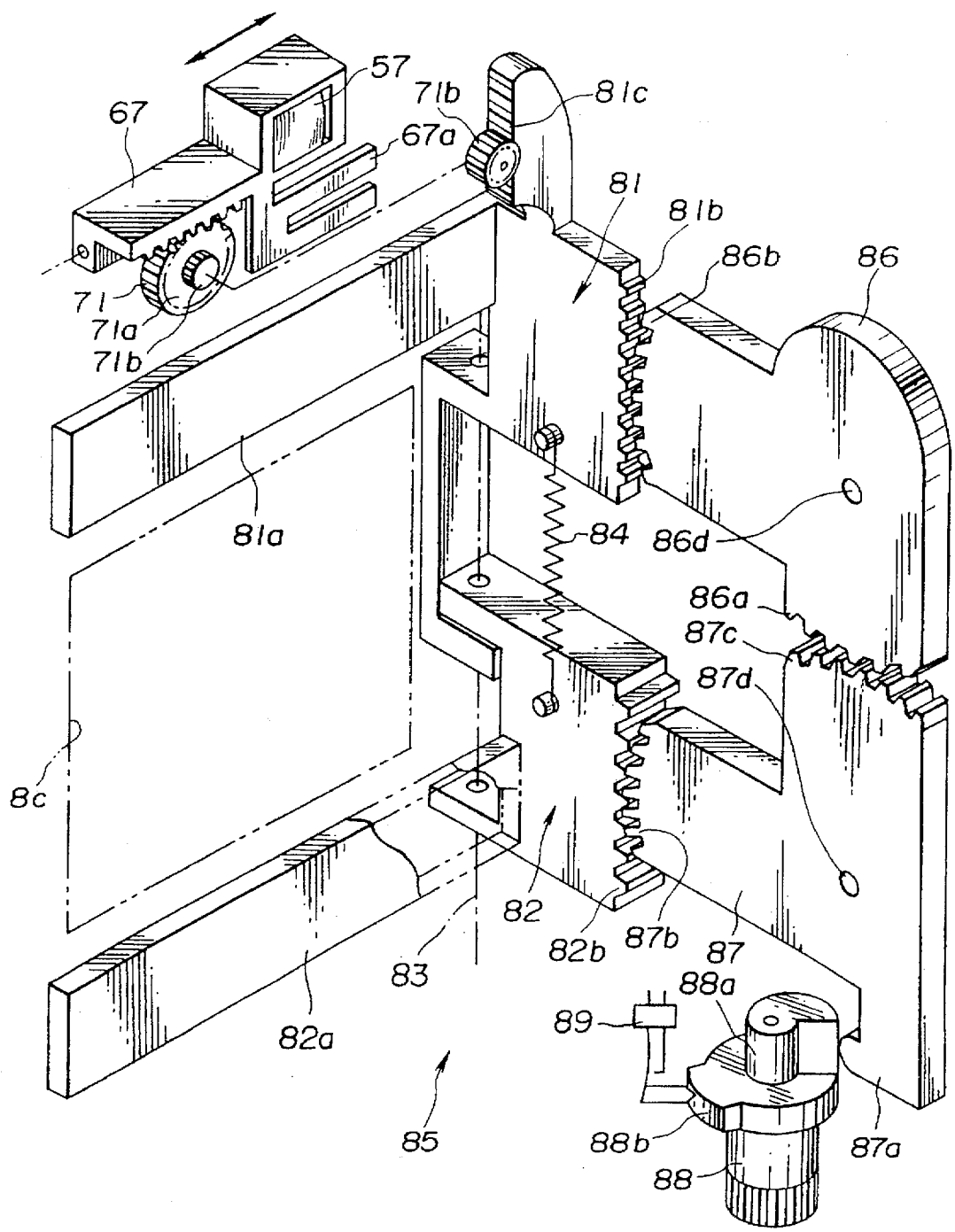
FIG. 22 is an oblique view showing the whole of a panoramic-mode setting mechanism in the camera of the embodiment of FIG. 1.

FIGS. 20 and 21 show a picture-size setting opening and a viewfinder field mask in the normal picture-size mode and panoramic mode. FIG. 22 is an oblique view showing a panoramic-mode setting mechanism.

The camera 1 has, as shown in FIG. 20, a rectangular picture-size setting opening 8c in the center thereof. spool chamber 8b is located on the right-hand side of the picture opening 8c, and a Patrone chamber 8a is located on the left-hand side of the picture opening 8c.

The camera body 8 accommodates a panoramic-mode setting mechanism 85 having an upper interceptive mask 81 and a lower interceptive mask 82. The upper interceptive mask 81 and lower interceptive mask 82 are moved vertically in order to limit a light beam passing through the picture-size setting opening 8c, if necessary. Thus, either a normal picture size or a panoramic picture size is selected.

The panoramic-mode setting mechanism 85 has a structure shown in FIG. 22.

The upper interceptive mask 81 and lower interceptive mask 82 are guided vertically along a stationary axis pin 83 supported by the base which is not shown, constrained to mutually approach by means of a panoramic-mode spring 84 serving as a constraining means, and thus coupled with each other.

The upper interceptive mask 81 comprises an interceptive section 81a that moves along the stationary axis 82 to advance or withdraw into or from the picture-size setting opening 8c of the camera body 8, a gear 81b formed on one side of a proximal portion of the upper interceptive mask 81, and a first rack 81c formed on a projecting top of the proximal portion thereof.

The lower interceptive mask 82 comprises an interceptive section 82a that moves along the stationary axis 83 to advance or withdraw into or from the picture-size setting opening 8c of the camera body 8, and a gear 82b formed on one side of a proximal portion of the lower interceptive mask 82.

The gear 81b of the upper interceptive mask 81 engages with a first panoramic-mode gear 86. The gear 82b of the lower interceptive mask 82 engages with a second panoramic-mode gear 87.

The first panoramic-mode gear 86 is supported by the base, which is not shown, so as to swivel freely about a swiveling center 86d. A partial gear 86b engaging with the gear 81b is formed on a distal end of one arm of the first panoramic-mode gear 86, and a partial gear 86a engaging with the second panoramic-mode gear 87 is formed at a distal end of the other arm thereof.

The second panoramic-mode gear 87 is supported by the base, which is not shown, so as to swivel freely about a swiveling center 87d. A partial gear 87b engaging with the partial gear 82b is formed on a distal end of one arm of the second panoramic-mode gear 87. A partial gear 87c engaging with the partial gear 86a of the first panoramic-mode gear 86 is formed on a distal end of the other arm thereof. An arm 87a serving as a cam follower is projects from the lower end thereof.

A first cam 88a of a cam gear 88 touches the arm 87a due to the constraining force of the panoramic-mode spring 84. A fragment of a picture size detection switch 89 locked in the base which is not shown is abutts on a second cam 88b of the cam gear 88. With the rotation of the cam gear 88, the picture size detection switch 89 is turned on or off.

When the cam gear 88 rotates, the second panoramic-mode gear 87 swivels with the swiveling center 87d as a point of support. Accordingly, the first panoramic-mode gear 86 swivels with the swiveling center 86d as a point of support. With the swiveling of the first and second panoramic-mode gears 86 and 87, the upper interceptive mask 81 and lower interceptive mask 82, which engage with the first and second panoramic-mode gears 86 and 87, move subordinately to advance or withdraw into or from the picture-size setting opening 8c simultaneously.

The camera body 8 accommodates, as shown in FIG. 20, the viewfinder structure member 50 of the viewfinder 5. The viewfinder structure member 50 retains the eyepiece variable-power lens 57 and the eyepiece variable-power lens frame 67 securely united with the viewfinder panoramic field mask 67a.

The eyepiece variable-power lens frame 67 has a second rack 67d. The second rack 67d engages with a large-diameter gear 71a of a panoramic-mode setting gear 71.

The panoramic-mode setting gear 71 is a dual gear composed of the large-diameter gear 71a and a small-diameter gear 71b which convey the motions of the interceptive masks 81 and 82 to the eyepiece variable-power lens frame 67. The panoramic-mode setting gear 71 is retained rotatively by the viewfinder structure member 50.

The small-diameter gear 71b of the panoramic-mode setting gear 71 engages with the first rack 81c of the upper interceptive mask 81. With the vertical movement of the upper interceptive mask 81, the small-diameter gear 71b causes the panoramic-mode setting gear 71 to rotate.

When the picture-size setting opening changes from the normal state shown in FIG. 20 to the panoramic-mode state shown in FIG. 21, the first rack 81c moves down. This causes the small-diameter gear 71b of the panoramic-mode setting gear 71 engaging with the first rack 81c to rotate. With this rotation, the large-diameter gear 71a of the panoramic-mode setting gear 71 rotates. The eyepiece variable-power lens frame 67, interlocked with the large-diameter gear 71a due to the second rack 67d,1 moves in a direction (right in FIG. 20) orthogonal to the direction in which the upper interceptive mask 81 moves.

When the eyepiece variable-power lens frame 67 is placed in the panoramic-mode state as mentioned above, the viewfinder panoramic field mask 67a is inserted to lie in front of the viewfinder field mask 55. Thus, when the viewfinder is looked through, the upper and lower areas of film is seen intercepted.

When the picture-size setting opening changes from the panoramic-mode state shown in FIG. 21 to the normal state shown in FIG. 20, the upper interceptive mask 81 moves up. This causes the first rack 81c to move up. The small-diameter gear 71b of the panoramic-mode setting gear 71 engaging with the first rack 81c then rotates counterclockwise in FIG. 21. With this rotation, the large-diameter gear 71a of the panoramic-mode setting gear 71 rotates. Consequently, the eyepiece variable-power lens frame 67 interlocked with the large-diameter gear 71a due to the second rack 67d moves to the left in FIG. 21 and returns to the state shown in FIG. 20.

According to the structure described in conjunction with FIGS. 20 and 21, changing picture sizes and changing the size of a viewfinder field mask can be achieved simultaneously. A shutter chance will not therefore be missed. Since a picture size and a viewfinder field size are always consistent with each other, photography will not be performed incorrectly or with an object vignetted with interceptive masks defining a picture size.

As mentioned above, the first rack 81c is interposed between the spool chamber 8b and picture-size setting opening 8c in the space in the upper part of the camera body 8. The second rack 67d is located above the picture-size setting opening 8c. These racks are coupled via the panoramic-mode setting gear 71. With the vertical movement of the upper interceptive mask 81, the viewfinder panoramic field mask 67a moves In a direction orthogonal to the direction in which the upper interceptive mask 81 moves. This structure enables efficient layout of the components of a camera. Consequently, a small-sized camera is realized.

In the aforesaid structure, the first rack 81c is located near the spool chamber 8b. Alternatively, the first rack 81c may be interposed between the Patrone chamber 8a and picture-size setting opening 8c in the space in the upper part of the camera body, while the other components may be arranged in the same manner.

Figure 23A:
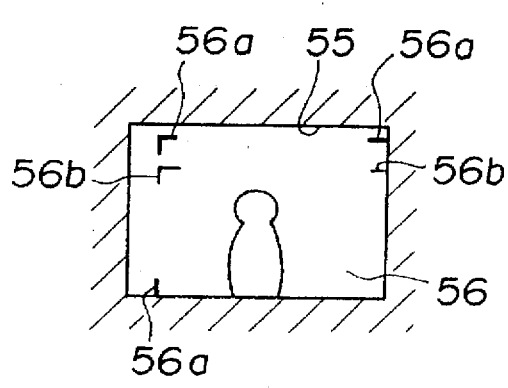
FIG. 23A shows parallax compensation marks for a normal picture-size mode appearing when looking into the viewfinder of the embodiment of FIG. 1.
Figure 23B:
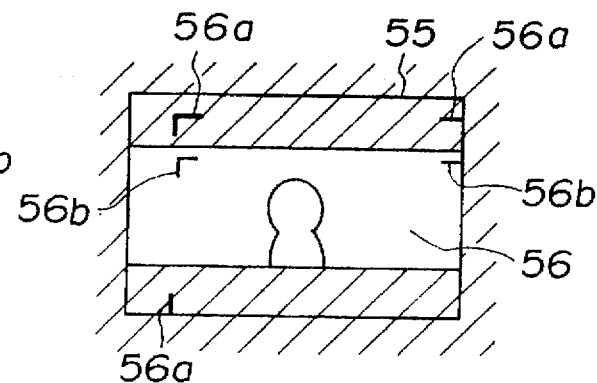
FIG. 23B shows parallax compensation marks for a panoramic mode appearing when looking into the viewfinder of the embodiment of FIG. 1.

FIGS. 23A and 23B show viewfinder fields of a normal picture size and a panoramic picture size observed through a viewfinder.

The viewfinder field of a normal picture size shown in FIG. 23A corresponds to almost the entire inside of the field mask 55 or a photographic range of film to be exposed.

As described above, the incident plane of the second prism 56 coincides with the image formation plane in the viewfinder optical system. When various targets (for example, various indicating means) are located on the incident plane, they can be observed during photography. Parallax compensation marks 56a and 56b for use during near photography are engraved on the incident plane of the second prism 56, which can be seen together with an object image.

The parallax compensation marks 56a for a normal picture size define a range of parallax compensation for normal photography. The lines of the normal picture-size parallax compensation marks 56a define a range in which an object can be photographed without fail during near photography. The normal picture-size parallax compensation marks 56a have a thickness permitting better discernment.

On the other hand, the parallax compensation marks 56b for a panoramic picture size define a range of parallax compensation for panoramic photography. The parallax compensation marks 56b have no meaning in the normal picture-size mode, which have therefore thin lines so as not to mess up a viewfinder field in the normal picture-size mode.

The viewfinder field of a panoramic picture size shown in FIG. 23B is available when the viewfinder field mask 67a securely united with the eyepiece variable-power lens frame 67 is inserted into the optical path of the viewfinder. As illustrated, the viewfinder field of a panoramic picture size is seen long sideways because the upper and lower areas of film are intercepted.

At this time, the eyepiece variable-power lens 57 retained by the eyepiece variable-power lens frame 67 is also inserted into the optical path of the viewfinder. This causes the power of the viewfinder to increase. The viewfinder can therefore provide an enlarged easy-to-see or impressive view. Note that the aforesaid panoramic picture-size parallax compensation marks 56b are also seen enlarged.

The enlarged panoramic picture-size parallax compensation marks 56b are seen as being substantially as thick as the normal picture-size parallax compensation marks 56a seen in the normal picture-size state. The normal picture-size parallax compensation marks 56a are hidden or expelled to a position outside of the viewfinder field of a panoramic picture size, and are therefore invisible.

The parallax compensation marks 56a and 56b are engraved on the incident plane of the second prism 56. Alternatively, the marks may be sputtered or printed. Depending on the structure of the viewfinder optical system, the marks may be drawn on a surface visible by a photographer; such as, a surface of a lens in the viewfinder or an emission surface of a prism in the viewfinder.

Figure 24A:
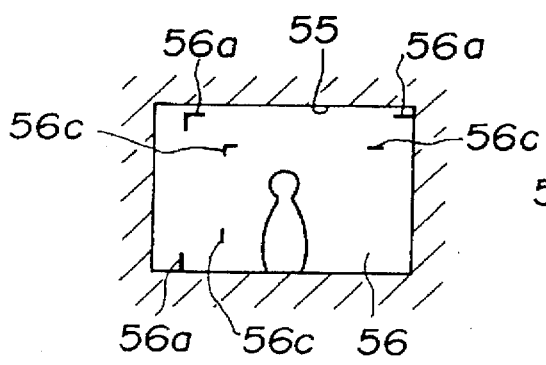
FIG. 24A shows another example of parallax compensation marks for a normal picture-size mode appearing when looking into the viewfinder of the embodiment of FIG. 1.
Figure 24B:
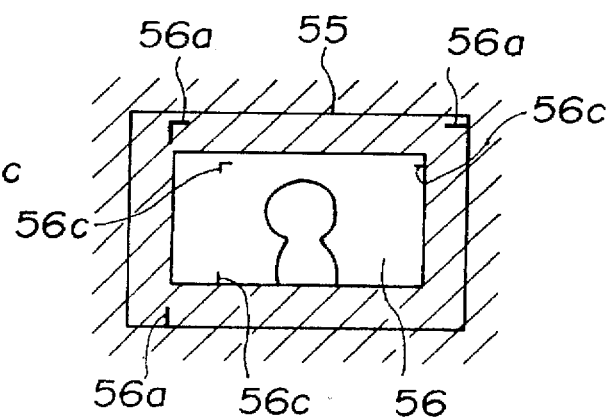
FIG. 24B shows another example of parallax compensation marks for a trimming mode appearing when looking into the viewfinder of the embodiment of FIG. 1.

Other examples of the foregoing parallax compensation marks are shown in FIGS. 24A and 24B. These drawings show a viewfinder field of a normal picture size and a trimmed viewfinder field.

The viewfinder field of a normal picture size shown in FIG. 24A is substantially identical to the one shown in FIG. 23A. Parallax compensation marks 56c for a trimmed picture size have thin and short lines so as not to mess up the normal picture-size field.

The trimmed viewfinder field shown in FIG. 24B differs from the field shown in FIG. 23B in the points that the picture size and the size of the field mask are reduced vertically and laterally alike, and that the viewfinder field is a similar figure of the normal picture-size viewfinder field.

However, the picture size is too small to see a view clearly. The eyepiece variable-power lens 57 is therefore used to increase the viewfinder power as mentioned above, so that the viewfinder field has the same size as the one provided by the field mask 55 at the normal viewfinder power.

The parallax compensation marks 56c in the trimmed viewfinder field are seen as having the same thickness and length as those in the normal picture-size field. The normal picture-size parallax compensation marks 56a are hidden or expelled to a position outside the trimmed viewfinder field, and are therefore invisible.

According to the structure shown in FIGS. 23A, 23B, 24A, and 24B, parallax compensation marks appear unobtrusively in the normal picture-size viewfinder field. In the panoramic picture-size viewfinder field or trimmed viewfinder field, parallax compensation marks for near photography are observed with a thickness, length, or size permitting better discernment due to the eyepiece variable-power lens 57.

The parallax compensation marks are drawn or engraved on a lens or prism. Alternatively, a transparent liquid crystal may be placed as a means for displaying the parallax compensation marks on the image formation plane in the viewfinder. The parallax compensation marks are then displayed with lines of different thicknesses or lengths. Otherwise, the parallax compensation marks may be displayed in different colors so as to be more discernible. When the liquid crystal display is employed, an AF target mark which is displayed in the center of the normal picture-size field may have sizes or thicknesses different between the panoramic and trimming modes.

Figure 25:
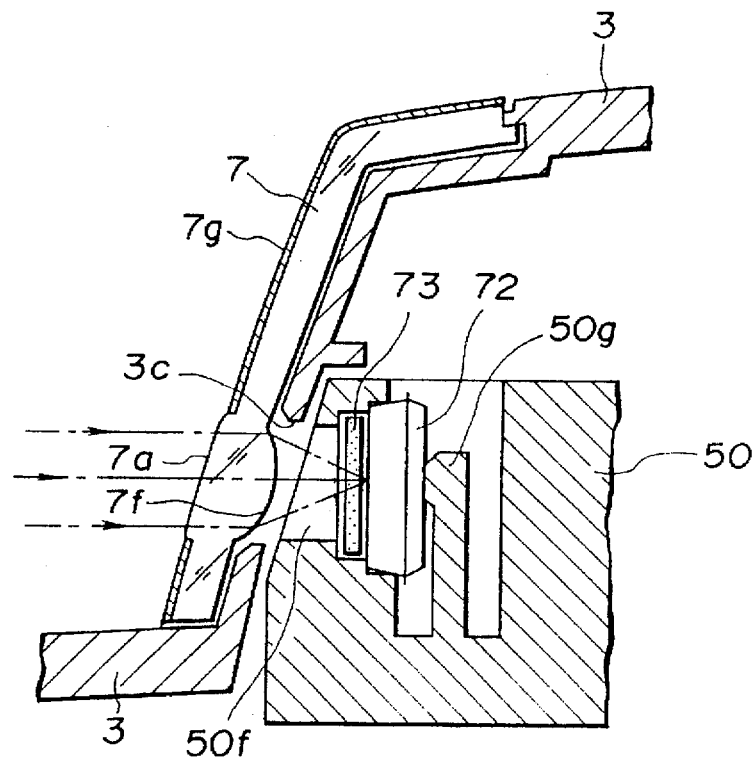
FIG. 25 is a sectional view showing a structure of a photometric optical system in the camera of the embodiment of FIG. 1.
Figure 26:
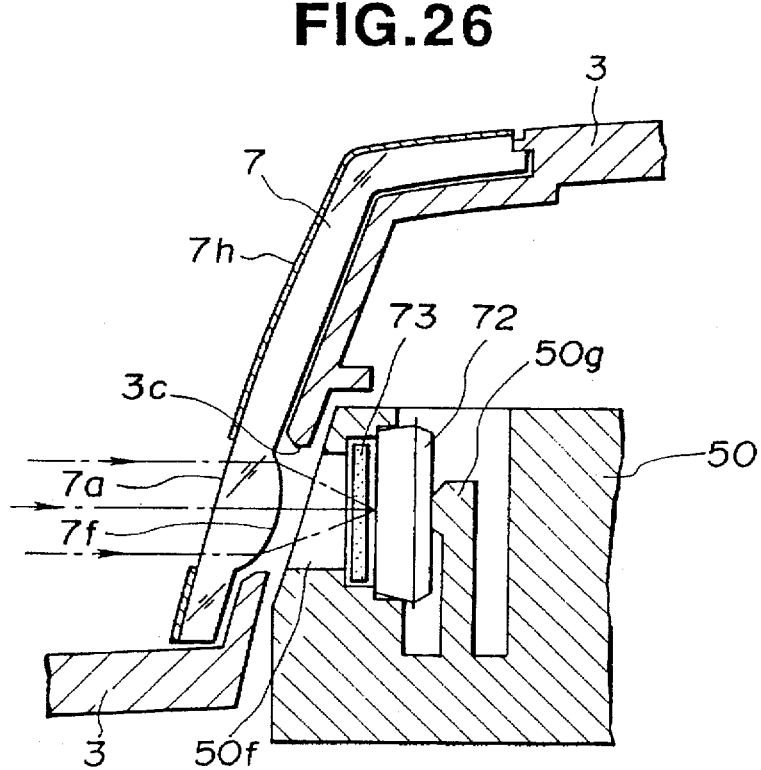
FIG. 26 is a sectional view showing another example of the structure of the photometric optical system in the camera of the embodiment of FIG. 1.

FIGS. 25 and 26 show a structure of a photometric optical system.

In FIG. 25, the viewfinder structure member 50 retains, as shown in FIG. 3, a photometric light receiving element 72 while pressing it using an elastic arm 50g. A photometric infrared cutoff filter 73 is placed in front of the photometric light receiving element 72 along the optical axis, so that the photometric light receiving element 72 can measure the intensities of rays that are almost visible rays.

A photometric opening 50f (FIGS. 3, 15 and 25) through which light enters is formed in front of the photometric light receiving element 72 along the optical axis. The photometric opening 50f prevents light emanating from laterally, which is unnecessary for measuring the intensity of light reflected from an object, from entering. The viewfinder structure member 50 is locked in the camera body 8 shown in FIG. 20.

The casing panel 7 is made of a transparent member and fixed to the front cover 3 using an adhesive or by performing deposition. The casing panel 7 has a lens 7f as part thereof located in front of the photometric light receiving element 72 along the optical axis inside the camera.

An interceptive coating film 7g is united with the surface of the casing panel 7 outside the camera by performing injection molding. The coating film 7g is not applied to the portion of the casing panel correspondent to an effective part of the lens 7f. The internal transparent member is bared in the effective part of the lens 7f, thus creating a photometric window 7a through which photometric light enters without being intercepted.

The front cover 3 also has an opening 3c as the portion thereof corresponding to the effective part of the lens 7f. The opening 3c serves as an aperture for the lens 7f. The diameter of the aperture is therefore determined as that of the opening 3c.

As mentioned above, a photometric lens is formed as part of the casing panel 7, so that a light beam reflected from an object can be converged for photometry.

FIG. 26 shows another example of the structure shown in FIG. 25.

As illustrated, an interceptive print 7h is applied to the outer surface of the casing panel 7. The interceptive print 7h is not applied to the portion of the casing panel 7 corresponding to the effective part of the lens 7f. The bared transparent member creates the photometric window 7a. The other components are arranged substantially in the same manner as those in FIG. 25.

Due to the structure shown in FIG. 25 or 26, unlike a prior art, a photometric lens need not be installed separately. Nevertheless, photometry can be performed. As a result, the space extending from a casing member to a photometric lens can be eliminated. The distance from a photometric lens to a light receiving element required for image formation starts at the inner surface of the casing member. This results in a small-sized camera.

Since part of the inner surface of a casing member is formed as a lens, the lens is resistive to flaws. Furthermore, since an interceptive film is applied to the inner surface of the casing member except the vicinity of the lens, light unnecessary for photometry can be cut off. This enables accurate photometry. Moreover, a photometric lens is formed as part of the casing member. Compared with a conventional photometric lens that is provided as an independent component, the photometric lens of this embodiment offers higher waterproofness and dustproofness.

As another example of the structure shown in FIG. 25 or 26, the photometric light receiving element 72 may be mounted directly in the casing panel 7 or front cover 3 but not in the viewfinder structure member 50. This makes it easy to highly precisely determine the position of the photometric light receiving element 72 relative to the optical axis of a photometric lens for assembling.

As yet another example of the structure shown in FIG. 25 or 26, a coating film characteristic of intercepting infrared light while transmitting visible light may be applied to the surface of the photometric window 7a of the casing panel 7 by performing injection molding or printing. This obviates the necessity of the photometric infrared cutoff filter 73. Consequently, a smaller-sized and lower-priced camera can be realized. A Fresnel lens may be employed as a photometric lens. This helps further reducing the size of the camera.

As described so far, according to the embodiment of the present invention, a rotary member and a cam member are coupled with each other by means of a drive belt. Since the route of the belt can be modified freely, a viewfinder can be located at any position within a camera. This has the advantage that components of a camera can be laid out more freely. Furthermore, a photometry unit and an AF light projector can be arranged in a space surrounded by a rotary member, a cam member, a drive belt, and a rotary frame. The components of a camera can therefore be laid out more neatly. As a result, a smaller-sized camera body can be realized.

When picture sizes are changed, an eyepiece variable-power lens and a trimmed field frame can be inserted into the optical path of a viewfinder with high precision by means of a simple mechanism composed of racks and gears. During trimming-mode photography, an easy-to-see enlarged object image can be made available.

Furthermore, the racks and gears are arranged neatly within a camera. This results in a small-sized camera.

When picture sizes are changed, the size of a viewfinder field is changed. A photographer can therefore determine a composition easily and observe parallax compensation marks for near photography with a size and a thickness which are the same between the viewfinder field of a normal picture size and that of a panoramic or trimmed picture size. This results in a viewfinder permitting better discernment.

In addition, a picture-size setting mask and a viewfinder field mask are changed in size at the same time. Moreover, indications observed through a viewfinder do not appear disorderly but are simple and easy to see. A photographer can therefore concentrate on an object and achieve photography without missing a shutter chance. Since a picture size and a viewfinder field size are always consistent with each other, photography will never be completed with incorrect framing.

An axis for guiding the movement of at least one viewfinder variable-power lens along the optical axis in order to vary the power of a viewfinder, and the ends of rotation restraining members for restraining the variable-power lens from rotating about the axis are retained by at least one of a stationary lens and a stationary prism which are respectively located forward and rearward of the variable-power lens. The position of the variable-power lens relative to at least one of the stationary lens and prism can be determined highly precisely. This enables realization of a smaller-sized viewfinder optical system without deteriorating the performance. As a result, a small-sized camera body can be realized. Furthermore, since the viewfinder optical system offers high precision, a viewfinder permitting better discernment and having greatly-alleviated adverse effects such as aberration can be realized.

In the present invention, it will be apparent that a wide range of different working modes can be formed on the basis of the invention without departing from the spirit and scope of the invention. This invention is not restricted to any specific embodiment but is limited only by the appended claims.

What is claimed is:

1. A camera, comprising:
   a cylindrical member supported to freely rotate;
   a yieldable constraining member for constraining said cylindrical member to rotate in a given direction;
   a rotary member rotated responsive to a zooming movement of a photographing lens array;
   a belt member for conveying rotational motion of said rotary member to said cylindrical member to drive said cylindrical member; and a viewfinder optical system that, when coupled with an outer circumference of said cylindrical member by means of a cam, selectively advances or withdraws in an optical-axis direction responsive to a zooming movement of said photographing lens array.

2. A camera according to claim 1, wherein said belt member has opposing ends thereof respectively fixed to said cylindrical member and said rotary member.

3. A camera according to claim 1, wherein said cylindrical member has a cam means that has a twisted slope, and said viewfinder optical system includes a viewfinder variable-power lens having a cam follower that abuts said cam means and a second yieldable constraining means for constraining said cam follower of said viewfinder variable-power lens to abut said cam means.

4. A camera according to claim 1, wherein said belt member is a flexible belt having first and second ends respectively wound about cylindrical portions of said driving member and said driven member.

5. A camera according to claim 4, wherein of end of said flexible belt unwinds about one of said cylindrical portions as another end of said flexible belt winds about another one of said cylindrical portions.

6. A camera according to claim 4, wherein said constraining member is a spring said spring yielding its biasing force when said cylindrical member is rotated in a first direction due to unwinding of said belt about the cylindrical member and urging said cylindrical member to rotate in a second direction to wind said flexible belt about said cylindrical member when said belt in unwound from said rotary member.

7. A camera according to claim 1, wherein said rotary member and said cylindrical member are arranged a spaced distance apart, at least a portion of said viewfinder optical system being positioned between said cylindrical member and said rotary member.

8. A camera according to claim 7, wherein an intermediate portion of said belt moves along a path adjacent to said portion of viewfinder optical system which is positioned to permit said belt intermediate portion to move without interference from said viewfinder optical system thereby providing a compact arrangement.

9. A camera according to claim 4 wherein said rotary member and said cylindrical member are arranged a spaced distance apart, said belt being of a length sufficient to extend said spaced distance.

10. A camera having a zoom viewfinder, comprising:

an optical system for zooming;

a driven member to be driven responsive to a zooming movement;

a zoom viewfinder optical system;

a driving member for driving said zoom viewfinder optical system; and a flexible coupling member for coupling said driven member to said driving member to impart a driving force from at least said driving member to said driven member.

11. A camera, comprising:

a cylindrical member supported to freely rotate;

a yieldable constraining member for constraining said cylindrical member to rotate in a given direction;

a rotary member rotated responsive to a movement for varying a power of a first optical system;

a flexible belt member for conveying rotational motion of said rotary member to said cylindrical member to drive said cylindrical member; and a second optical system that, when engaged by cam means along an outer circumference of said cylindrical member, moves to vary a power of said second optical system responsive to said movement for varying the power of said first optical system.

12. A camera, comprising:

a cylindrical member supported to freely rotate;

a constraining member for yieldable constraining said cylindrical member to rotate in a given direction;

a rotary member rotated responsive to a movement for varying a power of a first optical system;

a belt member for conveying rotational motion of said rotary member to said cylindrical member to drive said cylindrical member; and a second optical system whose power is varied with rotation of said cylindrical member.

* * * * *

UNITED STATES PATENT AND TRADEMARK OFFICE
CERTIFICATE OF CORRECTION

PATENT NO. : 5,678,093
DATED      : October 14, 1997
INVENTOR(S): Yasuo Asakura - Satsuya Kataoka It is certified that error appears in the above-indentified patent and that said Letters Patent is hereby corrected as shown below:

On the cover page under Inventors:
Delete "Yoshihiro Maeda; Keita Takahashi"

Signed and Sealed this

Third Day of February, 1998

BRUCE LEHMAN

*Attest:*

*Attesting Officer*   *Commissioner of Patents and Trademarks*